United States Patent
Shaw

(10) Patent No.: US 10,162,351 B2
(45) Date of Patent: Dec. 25, 2018

(54) REMOTE PROVISIONING OF A DRONE RESOURCE

(71) Applicant: AT&T INTELLECTUAL PROPERTY I, L.P., Atlanta, GA (US)

(72) Inventor: Venson Shaw, Kirkland, WA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 149 days.

(21) Appl. No.: 14/732,626

(22) Filed: Jun. 5, 2015

(65) Prior Publication Data

US 2016/0357183 A1 Dec. 8, 2016

(51) Int. Cl.
*G05D 1/00* (2006.01)

(52) U.S. Cl.
CPC .................. *G05D 1/0027* (2013.01)

(58) Field of Classification Search
CPC .................................... G05D 1/0027
See application file for complete search history.

(56) References Cited

U.S. PATENT DOCUMENTS

| | | | |
|---|---|---|---|
| 4,334,221 A | 6/1982 | Rosenhagen et al. | |
| 4,829,565 A | 5/1989 | Goldberg | |
| 5,404,516 A * | 4/1995 | Georgiades | G06Q 10/06 718/104 |
| 6,085,216 A * | 7/2000 | Huberman | G06F 9/50 718/102 |
| 6,819,982 B2 | 11/2004 | Doane | |
| 6,985,810 B2 * | 1/2006 | Moitra | G06Q 10/047 701/1 |

(Continued)

FOREIGN PATENT DOCUMENTS

| | | |
|---|---|---|
| EP | 0167625 A1 | 1/1986 |
| EP | 0687626 A1 | 12/1995 |

(Continued)

OTHER PUBLICATIONS

Baxter, et al., "Scheduling UAV Surveillance Tasks, Lessons Learnt from Trials with Users," IEEE International Conference on Systems, Man, and Cybernetics, 2013. (Year: 2013).*

(Continued)

*Primary Examiner* — Jelani A Smith
*Assistant Examiner* — Donald J Wallace
(74) *Attorney, Agent, or Firm* — Amin, Turocy & Watson, LLP

(57) ABSTRACT

Remote provision of a drone resource is disclosed. A user equipment (UE) can generate a request for drone resources that can be employed to find an appropriate drone from a set of drones. The drone can be automatically provisioned to allow access to the drone resource in accord with the request. The set of drones can comprise different tiers of drones. A response can be generated indicating the state of provisioning a drone in accord with the request. The user equipment can make the request available to a drone allocation component via a communication framework that can comprise a wireless interface. Provisioning of the drone can similarly be accomplished via the communication framework. As such, the set of drones can be distributed and can be provisioned from a UE located remotely from the drone allocation component and/or the drones comprising the set of drones.

20 Claims, 10 Drawing Sheets

(56) References Cited

U.S. PATENT DOCUMENTS

| | | | |
|---|---|---|---|
| 7,117,067 B2 | 10/2006 | Mclurkin et al. | |
| 7,130,741 B2 | 10/2006 | Bodin et al. | |
| 7,149,611 B2 | 12/2006 | Beck et al. | |
| 7,236,858 B2 | 6/2007 | Carpenter et al. | |
| 7,252,265 B2 | 8/2007 | Perlo et al. | |
| 7,551,577 B2 | 6/2009 | Mcrae | |
| 7,583,632 B2 | 9/2009 | Janevski et al. | |
| 7,831,259 B2 | 11/2010 | Cao et al. | |
| 7,844,364 B2* | 11/2010 | McLurkin | G06N 3/008 294/86.4 |
| 8,045,980 B2 | 10/2011 | Buckley et al. | |
| 8,059,631 B2 | 11/2011 | Anto | |
| 8,060,270 B2* | 11/2011 | Vian | G05D 1/104 348/144 |
| 8,160,606 B2 | 4/2012 | Shrivathsan et al. | |
| 8,213,458 B2 | 7/2012 | Norby | |
| 8,238,935 B2 | 8/2012 | Chen et al. | |
| 8,255,470 B2 | 8/2012 | Jackson et al. | |
| 8,260,485 B1* | 9/2012 | Meuth | G06Q 10/063 340/995.21 |
| 8,275,352 B2 | 9/2012 | Forstall et al. | |
| 8,315,800 B2 | 11/2012 | Sanchez et al. | |
| 8,369,867 B2 | 2/2013 | Van et al. | |
| 8,439,301 B1* | 5/2013 | Lussier | B64F 1/02 244/63 |
| 8,442,005 B2 | 5/2013 | Dutta et al. | |
| 8,442,483 B2 | 5/2013 | Gunasekara | |
| 8,521,328 B2 | 8/2013 | Jang | |
| 8,559,925 B2 | 10/2013 | Zhang | |
| 8,565,176 B2 | 10/2013 | Norlen et al. | |
| 8,565,780 B2 | 10/2013 | Soelberg et al. | |
| 8,649,774 B1 | 2/2014 | Zheng et al. | |
| 8,665,089 B2 | 3/2014 | Saigh et al. | |
| 8,676,406 B2 | 3/2014 | Coffman et al. | |
| 8,768,555 B2 | 7/2014 | Duggan et al. | |
| 8,787,318 B2 | 7/2014 | Pampu et al. | |
| 8,788,121 B2 | 7/2014 | Klinger | |
| 8,799,476 B2 | 8/2014 | Karaoguz et al. | |
| 8,817,707 B2 | 8/2014 | Gupta | |
| 8,824,439 B2 | 9/2014 | Jiang et al. | |
| 8,827,206 B2 | 9/2014 | Van et al. | |
| 8,903,426 B2 | 12/2014 | Tholkes et al. | |
| 8,918,075 B2 | 12/2014 | Maier et al. | |
| 8,958,928 B2 | 2/2015 | Seydoux et al. | |
| 8,965,598 B2 | 2/2015 | Kruglick | |
| 9,258,761 B2 | 2/2016 | Bertrand et al. | |
| 9,524,648 B1 | 12/2016 | Gopalakrishnan et al. | |
| 9,936,010 B1 | 4/2018 | Robbins et al. | |
| 2002/0161862 A1 | 10/2002 | Horvitz | |
| 2004/0030571 A1* | 2/2004 | Solomon | G05D 1/0088 700/248 |
| 2004/0073784 A1 | 4/2004 | Ishidoshiro | |
| 2005/0048918 A1 | 3/2005 | Frost et al. | |
| 2005/0105496 A1 | 5/2005 | Ambrosino | |
| 2006/0114324 A1* | 6/2006 | Farmer | G01S 7/003 348/144 |
| 2007/0171818 A1 | 7/2007 | Shoji et al. | |
| 2007/0284474 A1* | 12/2007 | Olson | H04W 4/046 244/10 |
| 2008/0135687 A1* | 6/2008 | Penzo | B64G 1/641 244/173.1 |
| 2008/0144884 A1 | 6/2008 | Habibi | |
| 2008/0194273 A1 | 8/2008 | Kansai et al. | |
| 2009/0156231 A1* | 6/2009 | Versteeg | G01S 5/0252 455/456.1 |
| 2009/0215469 A1 | 8/2009 | Fisher et al. | |
| 2009/0219393 A1* | 9/2009 | Vian | G07C 5/008 348/144 |
| 2009/0248587 A1* | 10/2009 | Van Buskirk | G06Q 50/188 705/80 |
| 2010/0024045 A1 | 1/2010 | Sastry et al. | |
| 2010/0240370 A1 | 9/2010 | Pandit et al. | |
| 2010/0250022 A1* | 9/2010 | Hines | G05D 1/101 701/2 |
| 2011/0035284 A1 | 2/2011 | Moshfeghi | |
| 2011/0072101 A1 | 3/2011 | Forsell et al. | |
| 2011/0090870 A1 | 4/2011 | Ronneke et al. | |
| 2011/0176424 A1 | 7/2011 | Yang et al. | |
| 2011/0196912 A1* | 8/2011 | Payton | G06Q 30/0611 709/202 |
| 2011/0301784 A1 | 12/2011 | Oakley et al. | |
| 2012/0004791 A1 | 1/2012 | Buelthoff et al. | |
| 2012/0029731 A1 | 2/2012 | Waldock et al. | |
| 2012/0058762 A1 | 3/2012 | Buckley et al. | |
| 2013/0034019 A1 | 2/2013 | Mustajarvi | |
| 2013/0039353 A1 | 2/2013 | Franco et al. | |
| 2013/0070641 A1 | 3/2013 | Meier et al. | |
| 2013/0077482 A1 | 3/2013 | Krishna et al. | |
| 2013/0107702 A1 | 5/2013 | Gupta et al. | |
| 2013/0128815 A1 | 5/2013 | Scherzer et al. | |
| 2013/0137423 A1 | 5/2013 | Das et al. | |
| 2013/0142056 A1 | 6/2013 | Abplanalp et al. | |
| 2013/0155849 A1 | 6/2013 | Koodli et al. | |
| 2013/0155851 A1 | 6/2013 | Koodli et al. | |
| 2013/0165120 A1 | 6/2013 | Nylander et al. | |
| 2013/0166103 A1 | 6/2013 | Ko | |
| 2013/0198397 A1 | 8/2013 | Zhang et al. | |
| 2013/0198817 A1 | 8/2013 | Haddad et al. | |
| 2013/0208693 A1 | 8/2013 | Orange | |
| 2013/0210385 A1 | 8/2013 | Ahmed et al. | |
| 2013/0214925 A1 | 8/2013 | Weiss | |
| 2013/0225161 A1 | 8/2013 | Chhabra et al. | |
| 2013/0259020 A1 | 10/2013 | Ullah et al. | |
| 2013/0304257 A1 | 11/2013 | Wang et al. | |
| 2013/0308622 A1 | 11/2013 | Uhlik | |
| 2013/0333016 A1 | 12/2013 | Coughlin et al. | |
| 2013/0340013 A1 | 12/2013 | Chadha | |
| 2014/0004854 A1 | 1/2014 | Veran et al. | |
| 2014/0018976 A1 | 1/2014 | Goossen | |
| 2014/0023059 A1 | 1/2014 | Gupta | |
| 2014/0025233 A1 | 1/2014 | Levien et al. | |
| 2014/0032034 A1* | 1/2014 | Raptopoulos | G08G 5/0069 701/25 |
| 2014/0081479 A1* | 3/2014 | Vian | G06Q 50/02 701/2 |
| 2014/0092886 A1 | 4/2014 | Gupta | |
| 2014/0106743 A1 | 4/2014 | Ferraro Esparza et al. | |
| 2014/0126360 A1 | 5/2014 | Rong et al. | |
| 2014/0126532 A1 | 5/2014 | Bapat et al. | |
| 2014/0140575 A1* | 5/2014 | Wolf | G06K 9/3233 382/103 |
| 2014/0187252 A1 | 7/2014 | Gupta et al. | |
| 2014/0192643 A1 | 7/2014 | Kalapatapu et al. | |
| 2014/0200749 A1 | 7/2014 | Spilsbury | |
| 2014/0206353 A1 | 7/2014 | Kim et al. | |
| 2014/0206439 A1 | 7/2014 | Tavano | |
| 2014/0241333 A1 | 8/2014 | Kim et al. | |
| 2014/0254434 A1 | 9/2014 | Jain et al. | |
| 2014/0254435 A1 | 9/2014 | Menendez et al. | |
| 2014/0254478 A1 | 9/2014 | Deshpande et al. | |
| 2014/0269654 A1 | 9/2014 | Canpolat et al. | |
| 2014/0312165 A1 | 10/2014 | Mkrtchyan | |
| 2014/0341076 A1 | 11/2014 | Orlandi et al. | |
| 2014/0378162 A1 | 12/2014 | Shatsky et al. | |
| 2015/0011241 A1 | 1/2015 | Papakipos et al. | |
| 2015/0017943 A1 | 1/2015 | Mitchell et al. | |
| 2015/0020147 A1 | 1/2015 | Krishnan et al. | |
| 2015/0065164 A1 | 3/2015 | Hoseinitabatabaei et al. | |
| 2015/0066248 A1* | 3/2015 | Arbeit | G01C 21/20 701/2 |
| 2015/0101503 A1 | 4/2015 | Brown | |
| 2015/0120094 A1* | 4/2015 | Kimchi | B64C 39/024 701/3 |
| 2015/0195759 A1 | 7/2015 | Sirotkin et al. | |
| 2015/0195858 A1 | 7/2015 | Jin et al. | |
| 2015/0223115 A1 | 8/2015 | Liang et al. | |
| 2015/0236778 A1 | 8/2015 | Jalali | |
| 2015/0264123 A1 | 9/2015 | Smadi et al. | |
| 2015/0282058 A1 | 10/2015 | Forssell | |
| 2015/0288797 A1 | 10/2015 | Vincent | |
| 2015/0304885 A1 | 10/2015 | Jalali | |
| 2015/0312808 A1 | 10/2015 | Kiss | |
| 2015/0319102 A1 | 11/2015 | Esdaile et al. | |

(56) References Cited

U.S. PATENT DOCUMENTS

| | | | |
|---|---|---|---|
| 2015/0327067 | A1 | 11/2015 | Shen et al. |
| 2015/0327136 | A1 | 11/2015 | Kin et al. |
| 2015/0365351 | A1* | 12/2015 | Suit .................... G06F 9/45558 709/226 |
| 2015/0373579 | A1 | 12/2015 | Xu et al. |
| 2016/0035224 | A1* | 2/2016 | Yang ................. H04B 7/18506 701/23 |
| 2016/0035343 | A1 | 2/2016 | Tang et al. |
| 2016/0050012 | A1 | 2/2016 | Frolov et al. |
| 2016/0117355 | A1 | 4/2016 | Krishnamurthy |
| 2016/0253710 | A1 | 9/2016 | Publicover et al. |
| 2016/0307449 | A1* | 10/2016 | Gordon ............... G08G 5/0069 |
| 2017/0323235 | A1 | 11/2017 | Johnston et al. |
| 2018/0206110 | A1 | 7/2018 | Chaki et al. |

FOREIGN PATENT DOCUMENTS

| | | | |
|---|---|---|---|
| EP | 2706790 | A1 | 3/2014 |
| GB | 2231220 | A | 11/1990 |
| GB | 2473825 | A | 3/2011 |
| WO | 2010064548 | A1 | 6/2010 |
| WO | 2013039573 | A2 | 3/2013 |
| WO | 2013134669 | | 9/2013 |
| WO | WO 2013163746 | A1 * | 11/2013 ............. H04N 7/181 |

OTHER PUBLICATIONS

Office Action dated Aug. 4, 2016 for U.S. Appl. No. 14/530,593, 34 pages.

Morgenthaler, Simon, et al. "UAVNet: A mobile wireless mesh network using unmanned aerial vehicles." 2012 IEEE Globecom Workshops. IEEE, 2012. Retrieved on Aug. 26, 2016. 6 pages.

Di Felice, Marco, et al. "Self-organizing aerial mesh networks for emergency communication." 2014 IEEE 25th Annual International Symposium on Personal, Indoor, and Mobile Radio Communication (PIMRC). IEEE, 2014. Retrieved on Aug. 26, 2016. 6 pages.

Office Action dated Sep. 21, 2016 for U.S. Appl. No. 14/732,631, 40 pages.

Boddhu, et al. "A collaborative smartphone sensing platform for detecting and tracking hostile drones", Ground/Air Multisensor Interoperability, Integration, and Networking for Persistent ISR IV, Proc. of SPIE vol. 8742, 874211. May 22, 2013. 11 pages.

Quaritsch, et al., "Collaborative Microdrones: Applications and Research Challenges", Autonomics 2008, Sep. 23-25, 2008, Turin, Italy. 7 pages.

Nova, et al., "The impacts of awareness tools on mutual modelling in a collaborative video-game", Groupware: Design, Implementation, and Use. vol. 2806 of the series Lecture Notes in Computer Science. Springer Berlin Heidelberg, 2003. 13 pages.

Choi, et al., "Collaborative Tracking Control of UAV-UGV", World Academy of Science, Engineering and Technology, International Scholarly and Scientific Research & Innovation, vol. 6, No. 11, 2012. 4 pages.

Zhao, Yilin. "Standardization of mobile phone positioning for 3G systems" IEEE Communications Magazine, Jul. 2002, 9 pages.

Paredes, et al. "SOSPhone: a mobile application for emergency calls", Universal Access in the Information Society Aug. 2014, vol. 13, Issue 3, 14 pages.

D'Roza, et al, "An Overview of Location-Based Services", BT Technology Journal, Jan. 2003, vol. 21, Issue 1, 8 pages.

Arminen, Ilkka. "Social functions of location in mobile telephony", Personal and Ubiquitous Computing, Aug. 2006, 5 pages.

Joseph, et al., "Interoperability of WiFi Hotspots and Cellular Networks", Proceedings of the 2nd ACM International Workshop on Wireless mobile applications and services in WLAN hotspots, Oct. 2004, 10 pages.

Li, et al., "Context-Aware Handoff on Smartphones", 2013 IEEE 10th International Conference on Mobile Ad-Hoc and Sensor Systems, Oct. 2013, 9 pages.

Tawil, et al., "Distributed Handoff Decision Scheme using MIH Function for the Fourth Generation Wireless Networks", 2008 3rd International Conference on Information and Communication Technologies: From Theory to Applications, Apr. 2008, 6 pages.

Taleb, et al., "On the Design of Energy-Aware 3GIWiFi Heterogeneous Networks under Realistic Conditions," 2013 27th International Conference on Advanced Information Networking and Applications Workshops, Mar. 2013, 5 pages.

Lee, et al, "Economics of WiFi offloading: Trading delay for cellular capacity", IEEE Transactions on Wireless Communications, vol. 13, No. 3, Mar. 2014, 15 pages.

Kotwal, et al. "Seamless Handoff between IEEE 802.11 and GPRS Networks", Distributed Computing and Internet Technology— Lecture Notes in Computer Science, Proceedings of the 6th International Conference, ICDCIT 2010, Feb. 2010, 7 pages.

Pyattaev, et al, "3GPP LTE traffic offloading onto WiFi Direct", IEEE Wireless Communications and Networking Conference Workshops, Apr. 2013, 6 pages.

Yang, et al, "A Performance Evaluation of Cellular/WLAN Integrated Networks," Fourth International Symposium on Parallel Architectures, Algorithms and Programming, Dec. 2011, 5 pages.

Bennis, et al, "When cellular meets WiFi in wireless small cell networks," IEEE Communications Magazine, Jun. 2013, vol. 51, Issue 6, 7 pages.

Melzer, et al, "Securing WLAN offload of cellular networks using subscriber residential access gateways," IEEE International Conference on Consumer Electronics, Jan. 2011, 2 pages.

Non-Final Office Action for U.S. Appl. No. 14/732,631 dated Apr. 28, 2016, 35 pages.

Non-Final Office Action for U.S. Appl. No. 14/549,119, dated Jul. 14, 2016, 21 pages.

Office Action dated May 18, 2017 for U.S. Appl. No. 14/732,631, 51 pages.

Office Action dated Aug. 8, 2017 for U.S. Appl. No. 15/480,341, 39 pages.

Office Action dated Nov. 13, 2017 for U.S. Appl. No. 14/732,631, 51 pages.

Office Action dated Jan. 10, 2018 for U.S. Appl. No. 15/476,956, 35 pages.

Notice of Allowance dated Jun. 14, 2018 for U.S. Appl. No. 14/732,631, 38 pages.

Office Action dated Sep. 5, 2018 for U.S. Appl. No. 15/352,559, 60 pages.

* cited by examiner

REMOTE PROVISIONING OF A DRONE RESOURCE

TECHNICAL FIELD

The disclosed subject matter relates to remotely controlled vehicles, including land, air, water, and space vehicles, e.g., drones for terrestrial, aerial, aquatic, or space use.

BACKGROUND

By way of brief background, conventional remotely controlled land, air, water, or space vehicles, often referred to as drones or unmanned aerial vehicles (UAVs), generally employ remote control operation and/or remote activation of vehicular self-control, e.g., autopilot, self-organized motion, self-implemented missions, etc. As an example, a consumer drone product, such as a quad-copter, can be operated via a remote control device. As another example, a military drone, such as a predator, global hawk, etc., can be operated from a control center located remotely from the drone and can include instructions that direct the drone to operate in an autonomous or semi-autonomous mode, such as self-guided flight between designated way points. As drones, for land, sea, air, and/or space operation, become more ubiquitous, intelligent allocation of drone resources can become increasingly significant.

DETAILED DESCRIPTION

Figure 1:
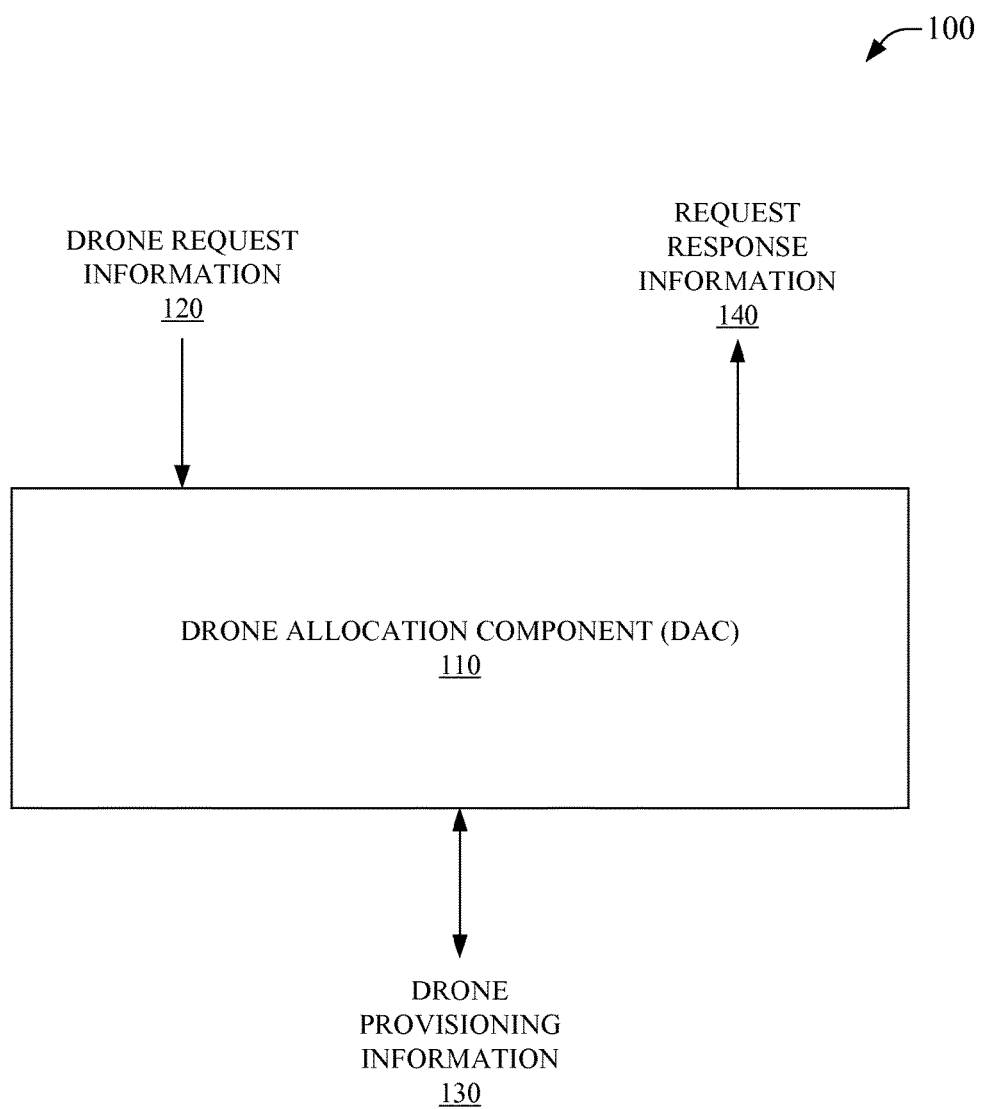
FIG. 1 is an illustration of an example system that facilitates remote provisioning of drone resources in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Conventional remotely controlled land, air, water, and/or space vehicles, hereinafter collectively referred to as drones, generally employ remote control operation and/or remote activation of vehicular self-control, in a generally closed system. The closed system can be expressed as ownership, e.g., a consumer can own a drone and operate the drone as their own, much as a car can be owned by a consumer and the car can be operated by the consumer. As an example, a consumer drone product, such as a model submarine, can be operated via a remote control device by the consumer. In an aspect, the consumer can cede control to another user typically in a real-time manner, such as by physically transferring the remote controller to another user to allow them to control the drone. As another example, a military drone can be operated from a control center located remotely from the drone for operation by designated military personnel, such as members of a drone pilot corps. As drones, for land, sea, air, and/or space operation, become increasingly ubiquitous, intelligent allocation of drone resources can become increasingly significant.

The instant disclosure seeks, in an aspect, to allocate drone resources intelligently in a shared manner, generally in the absence of physical transfer of a remote controller device between users. In an embodiment, remote provisioning of drone resources, e.g., allocating use of a drone to different sets of users, typically in a serial manner, can allow for improved access to drone resources. As an example, a first user can be allocated drone use via a drone allocation component for a first time period, and then a second user can be allocated use of the drone via the drone allocation component for a second time period. In this example, neither the first user, nor the second user, needs to actually own the drone, rather they can be accorded temporary use of the drone that can be owned by another entity, such as a drone rental company. This can be similar to reserving use of a shared automobile, where the first and second users may not own the car, but are allowed to use the car according to an agreement between the car owner and the intended users. However, unlike the shared car example, the use of the drone can be abstracted further, for example, a user can designate a drone mission, generally intended to mean a set of operations or goals for the drone to achieve, from a remote device, which the drone can then execute. In the context of the shared car example, this could be akin to requesting, at 8 am, that a shared car autonomously go buy a gallon of milk and deliver it to the user's house between 3 pm and 3:15 pm, and then having the shared car arrive at the user's house at 3:10 pm with the milk. Numerous other examples within the scope of the instant disclosure can readily be appreciated despite only a non-exhaustive handful of examples being disclosed herein for the sake of clarity and brevity. Failure to recite a particular example situation is not intended to exclude said particular example from the scope of the subject matter disclosed herein.

It will be noted that as drones become more pervasive and increasingly ubiquitous, remote provisioning of drone resources can be effective for efficient distribution of drone resources. As an example, rather than every news channel in a region owning and operating a separate drone for monitoring traffic, wherein the separate drones are to a large degree redundant, fewer traffic drones can be owned and the costs shared among the several news channels. In this example, the news channels could participate in an auction to reserve a drone for a particular use and can also participate in shared use, such as several news channels each contributing to the cost of the drone monitoring a regional roadway during rush hour. As such, when the drone is not monitoring the regional roadway, the drone could be reserved for use by other news channels, such as for aerial photography of a festival, monitoring of an evolving local news story, etc., without the need for the news channel to directly own the drone. In another example, even where a news channel does own a drone, use of that drone can be reserved for high priority uses, where more pedestrian uses can be allocated to shared drones that can be remotely provisioned, e.g., the regional traffic drone can provide traffic information to one or more news channels so that the other individually owned drone is unfettered and available for coverage of breaking news.

In effect, drones can become a more widely accessible resource that can be remotely provisioned. As such, drones can take on a communal character, a rented or leased character, a gift character, a benefit character, etc. In an aspect, privately owned drones can be made available to others, e.g., publically available, such as to anyone, semi-publically available, such as to members of a group meeting determined criteria, or shareable, such as to one or more specifically designated people. Moreover, publically owned drone resources can be deployed, e.g., publically owned drone resources can be deployed for public use. Additionally, white-list and black-list filtering can be employed to include or exclude users, or users associated with determined characteristics, histories, uses, etc.

Provisioning of the drone resource can include autonomous and/or semi-autonomous mission parameters. As an example, a drone can be remotely provisioned to monitor activity related to a curfew by flying a determined region in an autonomous manner. As another example, a drone can be remotely provisioned to arrive and remain proximate to a location in an autonomous manner where it will receive further instructions for operation from a user remote controller, such as via a smart phone touch interface, via a voice interface, via monitoring visual cues, such as hand signals, presented by a user or users, in the area of operation, etc. Expanding on the example, a dog trainer can request a drone arrive proximate to a dog park at a designated time, where it will circle until it receives voice commands from the user via a phone call from the user, whereupon the user can instruct the drone to track an identified dog with video feedback to the user's mobile device. This can allow the dog trainer to view the tracked dog via the drone, wherein the drone can keep the dog in view and provide the images to the trainer, even when the trainer does not have a sight line to the dog directly. In a similar example, a parent can request a drone 'walk their child to school' in the morning, wherein the drone can be provisioned to arrive and then track the child as they walk or ride a bike to school, providing images periodically unless the child departs from a determined route, wherein the drone can capture video, audio, location information, an audible alarm, etc. This could allow a parent to see that their child is taking unsafe shortcuts on their way to school, could capture valuable video imagery, such as a license plate number, in the case of an abduction, etc. Moreover, drones regularly operate with sensors that provide improved capture of information, which could allow the drone to capture audio from a scene, track a thermal image of the child through fog, rain, clouds, or darkness, etc., capturing RFIDs, SIM identifiers, etc., from devices proximate to the child, etc., which in an abduction situation could be immensely useful to law enforcement, such as getting a plate number of a van, video of the abduction even at night, and capturing the SIM identifier of a mobile device of the abductor contemporaneous with the abduction, all without the parent ever purchasing a drone, or physically renting and controlling the drone in an active manner. Remote provisioning of drone resources can have a definitive impact on access to drone resources in a manner that can reduce the consumption of user resources.

In an aspect, remote provisioning of drone resources can determine allocation of a drone according to parameters of drone request information. A drone can then be provisioned in accord with the determined allocation. A request response can then be generated. As an example, a drone request can be employed to determine drone request information, which can be received by a drone allocation component. The drone allocation component can then determine drone-provisioning information based on the drone request information. The drone provisioning information can be employed to provision the drone and, in response, an acknowledgement that the drone is provisioned can be returned to the user via a generated response comprising request response information. In an embodiment, the drone allocation component can employ the drone request information to select an appropriate drone from a set of one or more drones.

Selection can be based on parameters such as, but not limited to, a type of drone, a drone specification, an mission operating environment, drone availability, price, proximity, rules or laws, user profile, scheduling, a control interface or feature thereof, prior use of drones by the user, insurance features, intended use characteristics, certification, training, geographical or political boundaries, etc. As an example, parameters for remote provision of a drone can be very different where the drone in one case is to be used to film a back yard birthday party for a user's 10 year old son, and in another case, is to be used to monitor surfing conditions in front of an incoming weather system for a large surfing competition. However, a drone allocation component can determine what, if any, drone in one or more sets of available drones satisfy drone allocation parameters based on the drone request information.

It will be noted that the drone request information can be used to determine and/or infer values that can be employed in determining satisfaction of a drone allocation parameter, for example, the drone request information can comprise a designation that the drone have video capability which can be used to filter out drones without video. Further, the drone request information can comprise requestor income information that can be used to infer drones in a probably use cost/price range, allowing the drone allocation component to select a drone that meets designated parameters and is more likely to be 'affordable' to the requestor. It will be noted that many information vectors can be employed in inferring values that can be employed in determining satisfaction of a drone allocation parameter and that all such inferences are within the scope of the instant subject matter even where not explicitly disclosed for the sake of clarity and brevity. As another example, an inference can be made by the drone allocation component based on the requestor's usage history, drone operation certifications associated with the requestor, weather conditions, operational characteristics of one or more drones, etc., such that a drone can be allocated that is most likely to be comfortably usable by the requestor, e.g., analogously it can be inferred that it would be less likely for a 90-year old man would like to rent a landscaping truck with manual steering and without a tilt-bed, and more likely to want to rent a compact truck with power steering and a dump-bed, even though both would be effective at delivering one cubic yard of beauty bark to his home, even where the landscaping truck might be located closer and be available for the same cost.

Further, remote provisioning can interact with one or more sets or groups of drones. In some embodiments, these sets can be tiered, e.g., hierarchically tiered. Tiers of drone sets can be associated with different drone factors, for example, actual, anticipated, or estimated usage of drones or drone resources, ownership of drones or drone resources, organizational structures, regional proximities, etc. As an example, a first set of drones, comprising one or more drones, can be associated with private drones made available to users other than the private owners, such as drones owned by one or more persons in a neighborhood being made available for provisioning to the general public, other members of the neighborhood but not the general public, to members of a club or determined group, etc. As such, where the private drones are made available to the general public, then John Q. Public can request a drone that can be allocated from this first set of drones. Further, where a second set of drones can be associated with a corporation, this second set can be designated as at another tier, for example, where a satisfactory drone from the first set cannot be found, the second set can be searched for an appropriate drone. This hierarchical tier scheme can enable drones in different tiers to be identified based on criteria associated with the distinction between the tiers. As an example, where a corporation has three tiers of drone sets, the first tier can comprise older drones, the second tier can comprise newer drones that have already been amortized, and the third tier can comprise newer drones that have not yet been fully amortized. As such, request for a drone can first be searched against the first tier, then the second tier, then the third tier, wherein each tier can be associated with rules pertaining to the provisioning of a drone from that tier. Thus, where a satisfactory first tier drone is found, it can be provisioned in lieu of another satisfactory drone from the second or third tier drone sets.

Of note, the present disclosure is different from, and an improvement over, current 'drone sharing' techniques that generally rely heavily on human interaction. An example of a conventional drone rental technique involves an online reservation that can be made for a drone from a rental group, to which the renter must then travel to pick up the drone for use and must return it to after use. In contrast, the instant disclosure can provide for direct provisioning of an appropriate drone such that the drone arrives where/when needed and can operate in an autonomous or semi-autonomous mode, e.g., getting itself to the desired location and then taking commands, receiving a mission package and executing the mission autonomously, etc. As an example of another conventional system, higher end drones can be 'rented' online, wherein the renter discusses a mission with a human operator and the human operator coordinates execution of the mission for the renter. These types of services can be, for example, associated with a corporate user requesting a drone service provider to fly a mission over an oil field half a world away. The instant disclosure again differs from, and can be an improvement over, such technologies in that the drone typically can be automatically provisioned to execute the mission half a world away without generally needing to interact with the human operator. Of course, in some instances, especially where the mission is highly complex, inclusion of human operators or planners can be employed without departing from the scope of the present disclosure while still maintaining a differential improvement over those systems either in the reduction in human interaction over conventional systems, or for other reason elucidated herein. Remote provisioning of drone resources in a more automated manner is generally distinct from conventional techniques. Further, the ability to provision from different sets of drones, typically owned by different entities, and/or different tiers of drones, is substantially different from conventional technologies, more so in that, where drone sets comprise large numbers of drones, a drone allocation component can improve provisioning of an appropriate or satisfactory drone over conventional techniques. As an example, rather than having to manually select from a handful of drones via a website or with a human operator, the instant disclosure can enable searching across large numbers of drones based on parameters, characteristics, history, intended use, schedules, locations, interface features, a user profile, etc., in a manner that is far faster and typically more accurate than a manual search. This can facilitate efficient allocation of drones and associated resources, such that, for example, a drone can be provisioned from company B that is farther away, rather than company A that is closer, based on the drone from B just meeting the drone request parameters in contrast to the drone from A far exceeding the drone request parameters. Numerous other distinctions over conventional techniques are further expressly and inherently illustrated herein and are to be considered within the scope of the instant disclosure.

In an embodiment, a system can comprise a processor and a memory allowing execution of stored instructions to enable the processor to receive a request for allocation of a drone and determining a metric value associated with the request based on a rule related to scoring a set of requests against a set of drones associated with the drone resource. Provisioning the drone can be based on the request for allocation of the drone resource. This can enable access to the drone resource associated with the drone in accord with the request.

In another embodiment, a method can comprise receiving, by a system comprising a processor, a request for allocation of a drone resource via a communications framework. The method can further comprise determining, by the system, a ranking of a drone associated with the drone resource from a set of drones, wherein the ranking is based on a parameter determined from the request and a characteristic of the drone. Moreover, the method can comprise provisioning the drone by the system, based on the request for allocation of the drone resource based on the ranking.

In a further embodiment, a computer readable medium can comprise instructions that can cause a system comprising a processor to receive a request for allocation of a drone resource via a wireless communications framework and determine a ranking score of a drone associated with the drone resource. The ranking score can be based on a parameter determined from the request and a characteristic of the drone resource. Further, the processor can select the drone based on the ranking score and provision the drone based on the request for allocation of the drone resource.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages and novel features of the disclosed subject matter will become apparent from the following detailed description when considered in conjunction with the provided drawings.

FIG. 1 is an illustration of a system 100, which facilitates remote provisioning of drone resources in accordance with aspects of the subject disclosure. System 100 can include drone allocation component (DAC) 110 that can facilitate remote provisioning of drone resources. DAC 110 can receive drone request information 120. Drone request information 120 can comprise information related to requesting provisioning of a drone or drone related resource. Drone request information 120 can comprise name, address, phone number, identification information, account information, profile information, certifications information, logged hours or other training, mission parameters, such as, but not limited to, mission location, mission time, mission duration, mission type, mission payload, mission controller or interaction devices/services, level of autonomy, other drones/devices associated with the mission, etc., clearances, permits, approvals, waivers, mission path, mission locus resources available, e.g., power, fuel, internet connectivity, etc., historical drone use, additional operators/controllers, etc. It will be noted that nearly any pertinent information can be included in drone request information 120. In an embodiment, drone request information 120 can be generated by a mobile device, a desktop computer, a laptop computer, a wearable computing device, etc. Moreover, drone request information 120 can be originated by a first device, e.g., a mobile device, and can be supplemented with associated information from other devices. As an example, where a dad regularly monitors his daughter's little league game, a request for a drone can be originated by the dad for that afternoon's game while he is on the bus to work that morning. This request can indicate that historically similar missions have been executed and relevant information can be received in relation to those historically similar missions and with regard to the dad's profile and historical use of drones from cloud server devices to supplement drone request information 120 generated for that days game. Even where that afternoon's game is to be held at a different field, other mission parameters related to the type of mission, e.g., monitoring a baseball game, are relevant and can be captured in drone request information 120.

Further, drone request information 120 can comprise information that can be used to infer parameters, allowing DAC 110 to determine a drone that meets explicit and inferred parameters. It will be noted that nearly any information vector can be employed in inferring values that can be employed in determining satisfaction of a drone allocation parameter. As an example, an inference can be made by DAC 120 based on predicted weather that certain drone parameters are likely important. Where a drone request is made, for example, four months in advance of the mission date, the weather can be inferred initially for provisioning, and additional drones or associated resources can be earmarked where the inference is weak due to the long lead up time to the mission. As such, the inference can be revisited as the example weather information changes as the mission date approaches such that the provisioning of the drone can be updated and remain correspondingly more relevant.

DAC 120 can determine drone provisioning information 130. Drone provisioning information can include selection parameters. Selection parameters can include, but are not limited to, a type of drone, a drone specification, a mission operating environment, drone availability, price, proximity, rules or laws, user profile, scheduling, a control interface or feature thereof, prior use of drones by the user, insurance features, intended use characteristics, certification, training, geographical or political boundaries, etc. Selection parameters can be based on drone request information 120. Further, selection parameters can be based on other information, for example, drone set information, drone information for drones comprising a drone set, weather information, schedule information related to persons related to the mission event, etc., As an example, drone request information 120 can indicate both mom and dad will be at the little league game and direct mission operations via smartphones, this can trigger capture of the type of smartphone used by both mom and dad to be a parameter in selecting a drone that can interact with both types of phone. Drone allocation component 120 can determine what, if any, drone in one or more sets of available drones satisfy drone allocation parameters based on drone request information 120 and other related information. Additionally, selection parameters can identify a drone, a set of drones, multiple sets of drones, tiers of drones, etc. This information can be employed in determining, in conjunction with the selection information, a drone to provision.

Drone provision information 130 can be made accessible by DAC 110. As such, a selected drone can receive drone provisioning information 130. The drone can then indicate, either affirmatively, by absence of a refusal, etc., that it accepts being provisioned. In response, DAC 110 can generate request response information 140. Request response information 140 can indicate that provisioning was successful, that selection of a drone was made but provisioning failed, that a drone could not be selected that met the parameters, alternate drones available and information on what parameters are not satisfied, etc. Request response information 140 functions to provide information back to the requestor about the state of fulfilling a drone request, including information related to the provisioning of a drone. In some embodiments, request response information 140 can further comprise a request for additional parameter information where a large set of drones meet the parameters. In further embodiments, request response information 140 can comprise information related to user selection of an available drone, for example, where two drones are available and meet the parameters, the selection choice can be left to the user.

In an aspect, rather than provisioning a single drone, multiple drones can be provisioned and request response information 140 can reflect information related to the provisioning of multiple drones. Moreover, where only one drone is needed from the set of provisioned drones, provisioned drones can be released from the provisioning according to one or more rules. As an example, three drones can be initially provisioned, at mission time, one drone can experience a mechanical failure such that the second provisioned drone acts as a fail over and assumes the mission. Where the second drone assumes the mission and undertakes execution of the mission, the third provisioned drone can be released and made available in to satisfy other incoming drone requests via system 100. In some embodiments, drone provisioning can occur in one drone set, in multiple drone sets, in one tier, or in multiple tiers.

Figure 2:
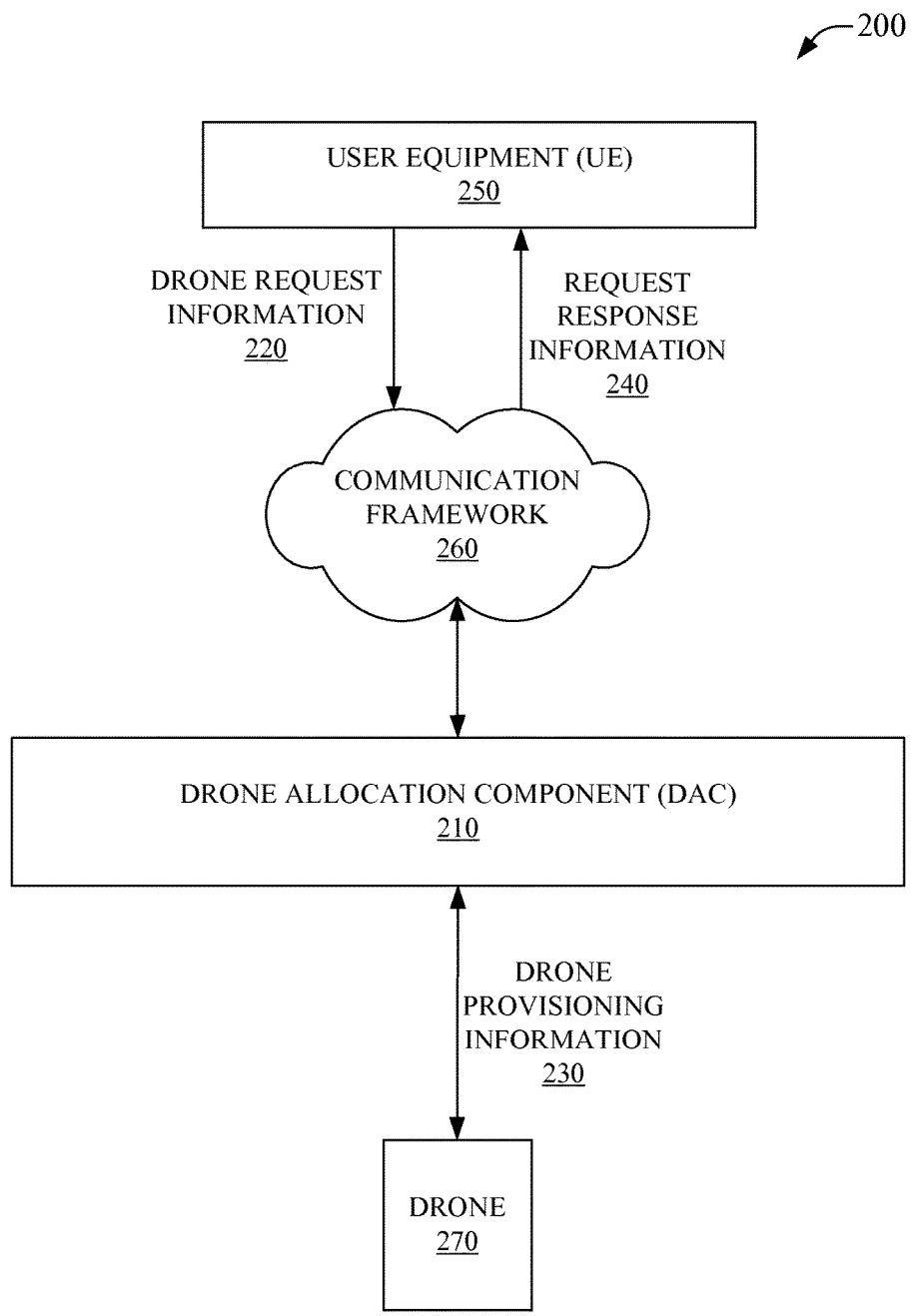
FIG. 2 is a depiction of an example system that facilitates remote provisioning of drone resources via a remotely located drone allocation component in accordance with aspects of the subject disclosure.

FIG. 2 is a depiction of a system 200 that can facilitate remote provisioning of drone resources via a remotely located drone allocation component in accordance with aspects of the subject disclosure. System 200 can include DAC 210 that can facilitate remote provisioning of drone resources. DAC 210 can receive drone request information 220 from user equipment (UE) 250 via communication framework 260. Drone request information 220 can comprise information related to requesting provisioning of a drone or drone related resource. Drone request information 220 can comprise name, address, phone number, identification information, account information, profile information, certifications information, logged hours or other training, mission parameters, such as, but not limited to, mission location, mission time, mission duration, mission type, mission payload, mission controller or interaction devices/services, level of autonomy, other drones/devices associated with the mission, etc., clearances, permits, approvals, waivers, mission path, mission locus resources available, e.g., power, fuel, internet connectivity, etc., historical drone use, additional operators/controllers, etc. It will be noted that nearly any pertinent information can be included in drone request information 220. Done request information 220 can be generated by UE 250, for example, a mobile device, a desktop computer, a laptop computer, a wearable computing device, etc. Moreover, drone request information 220 can be originated by a first UE 250 and can be supplemented with associated information from other UEs (not illustrated).

UE 250 can comprise or execute a user interface (not illustrated) that can allow input of information related to remote provisioning of a drone resource. In an embodiment, UE 250 can execute an application that can include a user interface, such as a graphical user interface (GUI), which can allow input of information related to remote provisioning of a drone resource. Information related to remote provisioning of a drone resource can include, but is not limited to, a date, a time, or other temporal or scheduling information, a location, drone mission parameters, specification of a drone type, drone model, etc., specification of drone mission payload or mission related equipment, such as image capture devices, speakers, radar devices, sonar devices, audio capture devices, laser range finders, or nearly any other type of sensor, instrument, or detector, for example, LiDAR, mass spectrometers, thermocouples, biological or chemical sensors, FUR-type devices, communications equipment, Wi-Fi access points, cellular access points, LTE access points, femtocells, etc. Of note, information related to remote provisioning of a drone resource can also include mission parameters, such as, but not limited to, waypoints, mission paths, designated operator(s) information, etc., related to execution of a mission, scheduling a mission, planning a mission, altering a mission, autonomous actions, semi-autonomous action, manual control of a drone, etc. Further, drone request information 220 can comprise information that can be used to infer parameters, allowing DAC 210 to determine a drone that meets explicit and inferred parameters. It will be noted that nearly any information vector can be employed in inferring values that can be employed in determining satisfaction of a drone allocation parameter.

DAC 220 can determine drone provisioning information 230. Drone provisioning information can include drone selection parameters. Selection parameters can include, but are not limited to, a type of drone, a drone specification, a mission operating environment, drone availability, price, proximity, rules or laws, user profile, scheduling, a control interface or feature thereof, prior use of drones by the user, insurance features, intended use characteristics, certification, training, geographical or political boundaries, etc. Selection parameters can be based on drone request information 220. Further, selection parameters can be based on other information, for example, drone set information, drone information for drones comprising a drone set, weather information, schedule information related to persons related to the mission event, etc. Drone allocation component 220 can determine what, if any, drone in one or more sets of available drones satisfy drone allocation parameters based on drone request information 220 and other related information. Additionally, selection parameters can identify a drone, a set of drones, multiple sets of drones, tiers of drones, etc. This information can be employed in determining, in conjunction with the selection information, a drone to provision.

Drone provisioning information 230 can be made accessible by DAC 210 to drone 270. As such, a selected drone, e.g., drone 270, or other drones can receive drone provisioning information 230. Drone 270 can then indicate, either affirmatively, by absence of a refusal, etc., that it accepts being provisioned. In response, DAC 210 can generate request response information 240 that can be accessed by UE 250 via communication framework 260. Request response information 240 can indicate that provisioning was successful, that selection of a drone was made but provisioning failed, that a drone could not be selected that met the parameters, alternate drones available and information on what parameters are not satisfied, etc. Request response information 240 functions to provide information back to the requestor via UE 250 about the state of fulfilling a drone request, including information related to the provisioning of a drone. In some embodiments, request response information 240 can further comprise a request for additional parameter information where a large set of drones meet the parameters. In further embodiments, request response information 240 can comprise information related to user selection of an available drone, for example, where two drones are available and meet the parameters, the selection choice can be left to the user.

In an aspect, rather than provisioning a single drone, multiple drones can be provisioned and request response information 240 can reflect information related to the provisioning of multiple drones. Moreover, where only one drone is needed from the set of provisioned drones, provisioned drones can be released from the provisioning according to one or more rules. As an example, three drones can be initially provisioned, at mission time, one drone can experience a mechanical failure such that the second provisioned drone acts as a fail over and assumes the mission. Where the second drone assumes the mission and undertakes execution of the mission, the third provisioned drone can be released and made available in to satisfy other incoming drone requests via system 200. In some embodiments, drone provisioning can occur in one drone set, in multiple drone sets, in one tier, or in multiple tiers.

Communication framework 260 can comprise wired and wireless communication links or segments. As an example, communication framework 260 can comprise a radio access network (RAN) associated with a wireless carrier, a Wi-Fi access point connected through the internet to DAC 210, a Bluetooth link to DAC 210, etc. Given that the instant disclosure can enable nearly any UE to remotely provision a drone resource, the communication framework 260 can often comprise internet server devices in the communication path between UE 250 and DAC 210. However, it is to be noted that the present disclosure is not limited solely to communication framework 260 comprising a link with, or between, internet servers.

UE 250 can receive input related to generating drone request information 220 or updating of other information relating to remotely provisioning a drone resource via various types of user input. In an embodiment, input can be received via a touch interface of UE 250, such as a GUI having a touch interface on a modern smartphone. In some embodiments, inputs can comprise audio or verbal inputs, such as, providing spoken information or commands via a microphone of UE 250 that can then be converted, e.g., via speech recognition components, into information related to provisioning a drone, updating a provisioned drone, or controlling the drone before, during, or after the mission. In additional embodiments, inputs can include references to information generated in other applications, or on other devices, such as saved mission parameter files, etc. These can be stored local to UE 250 or can reside on a remote storage device such as a cloud server, networked computer, etc. Additional embodiments can accept inputs generated in virtual environments, such as designating a mission path, e.g., a flight path, in a virtual environment, such as can be enabled by an optical head-mounted display, a holographic interface, etc.

Figure 3:
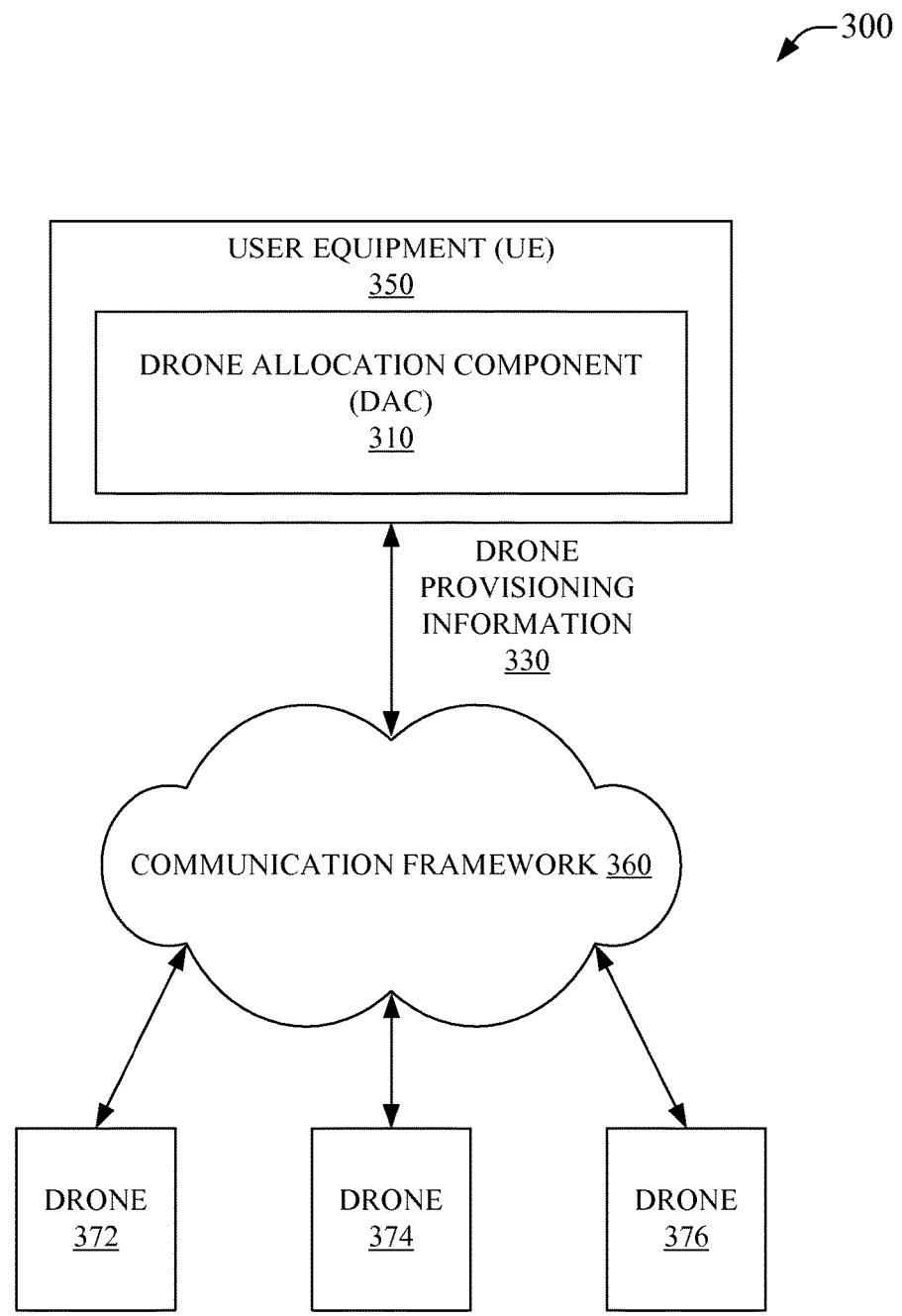
FIG. 3 illustrates an example system that facilitates remote provisioning of drone resources via a locally located drone allocation component in accordance with aspects of the subject disclosure.

FIG. 3 illustrates a system 300 that facilitates remote provisioning of drone resources via a locally located drone allocation component in accordance with aspects of the subject disclosure. System 300 can include UE 350. UE 350 can comprise DAC 310 that can facilitate remote provisioning of drone resources. DAC 310 can receive drone request information from UE 350 and can generate drone provisioning information 330. Drone provisioning information 330 can be communicated via communication framework 360 to one or more drones, e.g., drone 372, 3743, 376, etc. Drone request information received by DAC 310 of UE 350 can comprise information related to requesting provisioning of a drone or drone related resource, and can comprise name, address, phone number, identification information, account information, profile information, certifications information, logged hours or other training, mission parameters, such as, but not limited to, mission location, mission time, mission duration, mission type, mission payload, mission controller or interaction devices/services, level of autonomy, other drones/devices associated with the mission, etc., clearances, permits, approvals, waivers, mission path, mission locus resources available, e.g., power, fuel, internet connectivity, etc., historical drone use, additional operators/controllers, etc. It will be noted that nearly any pertinent information can be included in drone request information communicated to DAC 310 by UE 350. Moreover, drone request information can be supplemented with associated information from other UEs (not illustrated) via UE 350.

UE 350 can comprise a user interface that can allow input of information related to remote provisioning of a drone resource. In an embodiment, UE 350 can execute an application that can include a user interface, such as a graphical user interface (GUI), which can allow input of information related to remote provisioning of a drone resource. Information related to remote provisioning of a drone resource can include, but is not limited to, a date, a time, or other temporal or scheduling information, a location, drone mission parameters, specification of a drone type, drone model, etc., specification of drone mission payload or mission related equipment, such as image capture devices, speakers, radar devices, sonar devices, audio capture devices, laser range finders, or nearly any other type of sensor, instrument, or detector, for example, LiDAR, mass spectrometers, thermocouples, biological or chemical sensors, FLIR-type devices, communications equipment, Wi-Fi access points, cellular access points, LTE access points, femtocells, etc. Of note, information related to remote provisioning of a drone resource can also include mission parameters, such as, but not limited to, waypoints, mission paths, designated operator(s) information, etc., related to execution of a mission, scheduling a mission, planning a mission, altering a mission, autonomous actions, semi-autonomous action, manual control of a drone, etc. Further, drone request information can comprise information that can be used to infer parameters, allowing DAC 310 to determine a drone that meets explicit and inferred parameters. It will be noted that nearly any information vector can be employed in inferring values that can be employed in determining satisfaction of a drone allocation parameter. UE 350 can receive input related to generating drone request information via various types of user input. In an embodiment, input can be received via a touch interface of UE 350, such as a GUI having a touch interface on a modern smartphone. In some embodiments, inputs can comprise audio or verbal inputs, such as, providing spoken information or commands via a microphone of UE 350 that can then be converted, e.g., via speech recognition components, into information related to provisioning a drone, updating a provisioned drone, or controlling the drone before, during, or after the mission. In additional embodiments, inputs can include references to information generated in other applications, or on other devices, such as saved mission parameter files, etc. These can be stored local to UE 350 or can reside on a remote storage device such as a cloud server, networked computer, etc. Additional embodiments can accept inputs generated in virtual environments, such as designating a mission path, e.g., a flight path, in a virtual environment, such as can be enabled by an optical head-mounted display, a holographic interface, etc.

DAC 310 can determine drone provisioning information 330. Drone provisioning information can include drone selection parameters. Selection parameters can include, but are not limited to, a type of drone, a drone specification, a mission operating environment, drone availability, price, proximity, rules or laws, user profile, scheduling, a control interface or feature thereof, prior use of drones by the user, insurance features, intended use characteristics, certification, training, geographical or political boundaries, etc. Selection parameters can be based on drone request information. Further, selection parameters can be based on other information, for example, drone set information, drone information for drones comprising a drone set, weather information, schedule information related to persons related to the mission event, etc. Drone allocation component 310 can determine what, if any, drone in one or more sets of available drones, e.g., drones 372-376, etc., satisfy drone allocation parameters based on drone request information and other related information. Additionally, selection parameters can identify a drone, a set of drones, multiple sets of drones, tiers of drones, etc. This information can be employed in determining, in conjunction with the selection information, a drone to provision.

Drone provisioning information 330 can be made accessible by DAC 310 to drone 370, 374, and 376, to enable provisioning of one or more of the drones 372-376. As such, a selected drone(s), e.g., drones 372-376, or other drones, can receive drone provisioning information 330. Drones 372-376 can then indicate, either affirmatively, by absence of a refusal, etc., that it accepts being provisioned. In an embodiment, the first drone, e.g., of 372-376, to indicate acceptance of provisioning can cause the other drones to be released, e.g., a first in first out (FIFO) schema. In other embodiments, drones 372-376 can negotiate, e.g., via communication framework 360, as to which drone will accept provisioning. In an aspect, drones 372-376 can represent a selected subset of available drones wherein final acceptance of provision can be FIFO or negotiated. In this aspect, drone provisioning information 330 can be analogous to unicast information sent specifically to drones 372-374. In another aspect, drones 372-376 can represent unselected drones that receive widely broadcast drone provisioning information 330, wherein acceptance of provisioning by one or more drones can be performed at the drones themselves based on drone provisioning information 330 generated by DAC 310. In this aspect, drone provisioning information 330 can be analogous to multicast information sent broadly to drones 372-374. In a further aspect, drones 372-376 can represent selected sets of unselected drones that receive widely broadcast drone provisioning information 330, wherein acceptance of provisioning by one or more drones can be performed at the drones themselves based on drone provisioning information 330 generated by DAC 310. In this aspect, the sets of drones, e.g., drone 372-376 can be specifically targeted by DAC 310, however the sets may contain multiple drones that subsequently can self-select within the set. This can analogously act as a hybrid of unicast and multicast information made available to drones 372-374.

In response to acceptance of provisioning by one or more of drone 372-376, DAC 310 can generate request response information that can be accessed by UE 350. Request response information can indicate that provisioning was successful, that selection of a drone was made but provisioning failed, that a drone could not be selected that met the parameters, alternate drones available and information on what parameters are not satisfied, etc. Request response information can functions to provide information back to the requestor via UE 350 about the state of fulfilling a drone request, including information related to the provisioning of a drone. In some embodiments, request response information can further comprise a request for additional parameter information where a large set of drones meet the parameters. In further embodiments, request response information can comprise information related to user selection of an available drone, for example, where two drones are available and meet the parameters, the selection choice can be left to the user. In an aspect, rather than provisioning a single drone, multiple drones can be provisioned and request response information can reflect information related to the provisioning of multiple drones. Moreover, where only one drone is needed from the set of provisioned drones, provisioned drones can be released from the provisioning according to one or more rules. In some embodiments, drone provisioning can occur in one drone set, in multiple drone sets, in one tier, or in multiple tiers.

Communication framework 360 can comprise wired and wireless communication links or segments. Wherein nearly any UE can remotely provision a drone resource, communication framework 360 can often comprise internet server devices in the communication path between UE 350 and drones 372-376. However, it is to be noted that the present disclosure is not limited solely to communication framework 360 comprising a link with, or between, internet servers.

In another embodiment, DAC 310 can be virtualized, in whole or in part, and virtualized parts can be comprised in communication framework 360, not illustrated. As such, UE 350 can communicate via communication framework 360 to virtual DAC 310 components. Where DAC 310 is fully virtualized, DAC 310 may not be comprised in UE 350, but rather would be comprised in communication framework 360 and in communication with UE 350. Where DAC 310 is partially virtualized, a portion of DAC 310 can be comprised in UE 350 and in communication with the virtualized portion of DAC 310 comprised in communication framework 360. As an example, DAC 310 can be a 'thin client' application on UE 350 that is in communication with a virtualized DAC 310 residing in the cloud, e.g., executing on cloud server platforms, to enable DAC 310 functionality in remotely provisioning drone resources 372-376.

Figure 4:
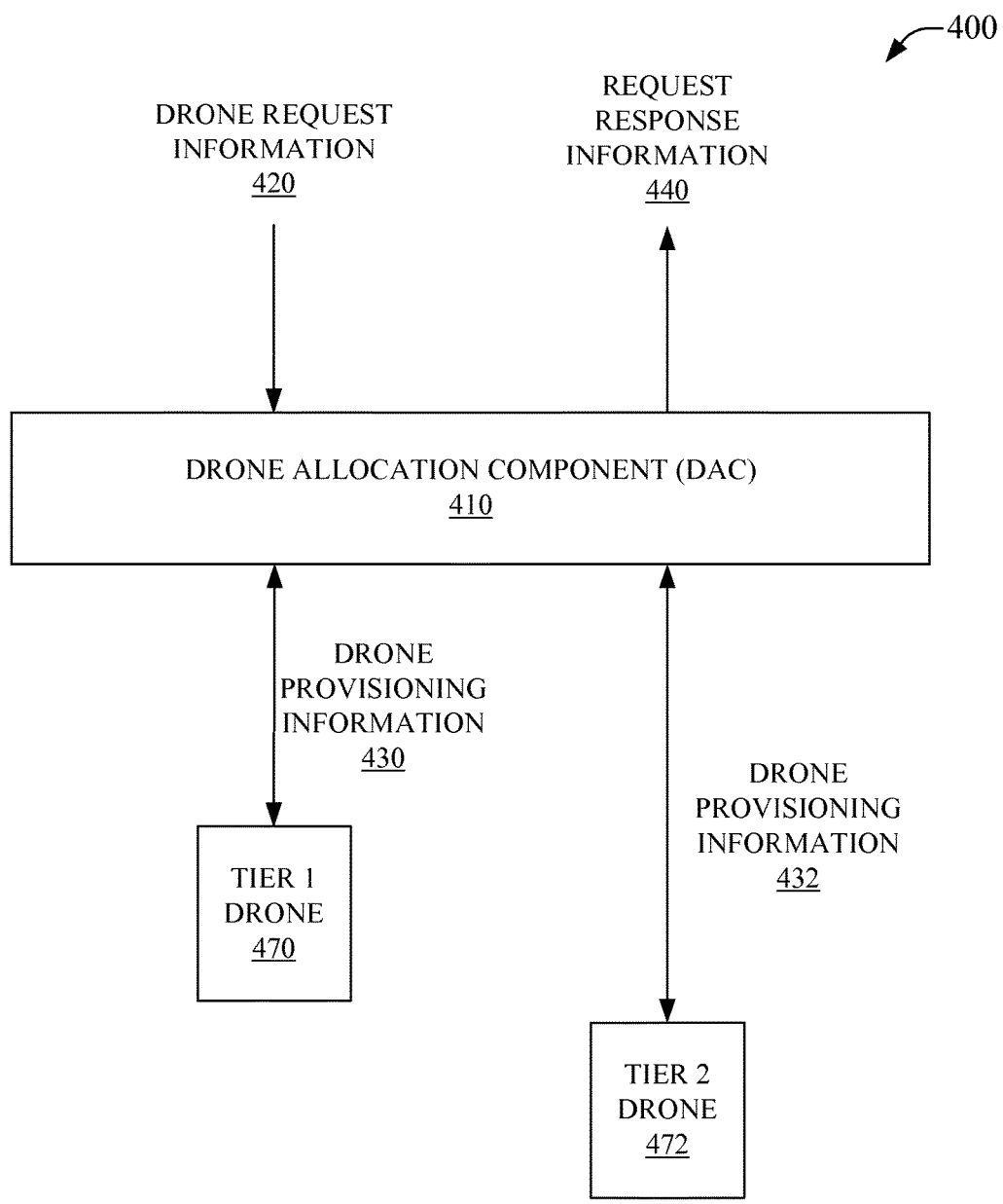
FIG. 4 illustrates an example system that facilitates remote provisioning of drone resources organized in a tiered environment in accordance with aspects of the subject disclosure.

FIG. 4 illustrates a system 400 that facilitates remote provisioning of drone resources organized in a tiered environment in accordance with aspects of the subject disclosure. System 400 can include DAC 410 that can facilitate remote provisioning of tiered drone resources. DAC 410 can receive drone request information 420. Drone request information 420 can comprise information related to requesting provisioning of a drone or drone related resource. Drone request information 420 can comprise name, address, phone number, identification information, account information, profile information, certifications information, logged hours or other training, mission parameters, such as, but not limited to, mission location, mission time, mission duration, mission type, mission payload, mission controller or interaction devices/services, level of autonomy, other drones/devices associated with the mission, etc., clearances, permits, approvals, waivers, mission path, mission locus resources available, e.g., power, fuel, internet connectivity, etc., historical drone use, additional operators/controllers, etc. It will be noted that nearly any pertinent information can be included in drone request information 420. In an embodiment, drone request information 420 can be generated by a mobile device, a desktop computer, a laptop computer, a wearable computing device, etc. Moreover, drone request information 420 can be originated by a first device, e.g., a mobile device, and can be supplemented with associated information from other devices. Further, drone request information 420 can comprise information that can be used to infer parameters, allowing DAC 410 to determine a drone that meets explicit and/or inferred parameters. It will be noted that nearly any information vector can be employed in inferring values that can be employed in determining satisfaction of a drone allocation parameter.

DAC 420 can determine drone provisioning information 430 and 432.

Drone provisioning information 430-432 can include selection parameters. Selection parameters can include, but are not limited to, a type of drone, a drone specification, a mission operating environment, drone availability, price, proximity, rules or laws, user profile, scheduling, a control interface or feature thereof, prior use of drones by the user, insurance features, intended use characteristics, certification, training, geographical or political boundaries, etc. Selection parameters can be based on drone request information 420. Further, selection parameters can be based on other information, for example, drone set information, drone information for drones comprising a drone set, weather information, schedule information related to persons related to the mission event, etc. Drone allocation component 420 can determine what, if any, drone in one or more sets of available drones, e.g., tier 1 drone(s) 470 and tier 2 drone(s) 472, satisfy drone allocation parameters based on drone request information 420 and other related information. Additionally, selection parameters can identify a drone, a set of drones, multiple sets of drones, tiers of drones, etc. This information can be employed in determining, in conjunction with the selection information, a drone to provision.

Drone provision information 430 can be made accessible by DAC 410. As such, a selected drone, e.g., tier 1 drone(s) 470 and tier 2 drone(s) 472, can receive drone provisioning information 430. The drone can then indicate, either affirmatively, by absence of a refusal, etc., that it accepts being provisioned. In response, DAC 410 can generate request response information 440. Request response information 440 can indicate that provisioning was successful, that selection of a drone was made but provisioning failed, that a drone could not be selected that met the parameters, alternate drones available and information on what parameters are not satisfied, etc. Request response information 440 can function to provide information back to the requestor about the state of fulfilling a drone request, including information related to the provisioning of a drone, e.g., tier 1 drone(s) 470 and tier 2 drone(s) 472. In some embodiments, request response information 440 can further comprise a request for additional parameter information where a large set of drones meet the parameters. In further embodiments, request response information 440 can comprise information related to user selection of an available drone, for example, where two drones are available and meet the parameters, the selection choice can be left to the user.

In an aspect, rather than provisioning a single drone, multiple drones can be provisioned and request response information 440 can reflect information related to the provisioning of multiple drones. Moreover, where only one drone is needed from the set of provisioned drones, provisioned drones can be released from the provisioning according to one or more rules. In some embodiments, drone provisioning can occur in one drone set, in multiple drone sets, in one tier, or in multiple tiers.

In an aspect, drones can be organized in one or more tiers, e.g., tier 1 drone(s) 470 and tier 2 drone(s) 472. Tiers of drone sets can be associated with different drone factors, for example, actual, anticipated, or estimated usage of drones or drone resources, ownership of drones or drone resources, organizational structures, regional proximities, etc. As an example, a first set of drones, comprising one or more drones, can be associated with private drones made available to users other than the private owners, such as drones owned by one or more persons in a neighborhood being made available for provisioning to the general public, other members of the neighborhood but not the general public, to members of a club or determined group, etc. As such, where the private drones are made available to the general public, then John Q. Public can request a drone that can be allocated from this first set of drones. Further, where a second set of drones can be associated with a corporation, this second set can be designated as at another tier, for example, where a satisfactory drone from the first set cannot be found, the second set can be searched for an appropriate drone. In an embodiment, a hierarchical tier scheme can enable drones in different tiers to be identified based on criteria associated with the distinction between the tiers. As an example, where a corporation has three tiers of drone sets, the first tier can comprise older drones, the second tier can comprise newer drones that have already been amortized, and the third tier can comprise newer drones that have not yet been fully amortized. As such, request for a drone can first be searched against the first tier, then the second tier, then the third tier, wherein each tier can be associated with rules pertaining to the provisioning of a drone from that tier. Thus, where a satisfactory first tier drone is found, it can be provisioned in lieu of another satisfactory drone from the second or third tier drone sets.

In an embodiment, organizing drones into tiers can be performed by DAC 410. DAC 410 can receive drone information from drones available to participate in remote drone provisioning and can assign these available drones to one or more tiers, or one or more sets of drones within one or more tiers. Nearly any criteria can be employed in determining sets and/or tiers of drone membership. In a further embodiment, drone ranking or assignment to a particular group or tier, can be associated with information related to an owner profile, such as, a drone owner assigning a ranking value associated with external use of the drone by others, etc. In some embodiments, drone tiers, e.g., 470, 472, etc., can be static or dynamic assignments. Further, in some embodiments, drone assignment to groups or tiers can be determined by devices other than DAC 410.

As an example, an online commerce company, 'Jungle.com', can employ drones for delivery of packages and can desire to further monetize their drones by allowing them to be provisioned for use by the public. The drones of Jungle.com can be primarily intended for corporate use but unused drones can be rented out to the public. As such, Jungle.com can employ their sales projections to determine an expected surplus of drone resources. A first half of the expected surplus can be designated as publically available and associated with a first tier, while the second half of the expected surplus can be designated as public available and associated with a second tier. This first tier can further be associated with a lower use price than the second tier. DAC 410 can receive this availability and tier information from Jungle.com and can add the tier one drones to other tier one drones from other owners and can add the second tier drones of Jungle.com to a second tier pool of drones known to DAC 410. When a drone request comes into DAC 410, an acceptable drone from the tier one pool of drones, e.g., tier 1 drone 470, can be determined, via drone provisioning information 430. Where an acceptable drone is not found, a subsequent search can be performed, via drone provisioning information 432 on the second tier drones, e.g., tier 2 drone 472. This can allow Jungle.com's first tier drones to be provisioned before considering provisioning of the second tier drones. The disparity between the tiers can be employed to better ensure that some of the excess drones from Jungle.com are less likely to be rented out just in case Jungle.com may need them. Further, wherein the allocation of drones can be dynamic, all of the Jungle.com drones can be included in the first tier drones until half of them have been provisioned, at which point, the remaining half of Jungle.com's surplus drones can be dynamically designated as second tier drones. This can allow selection drones from the full set of drones, such as by functionality, while still reserving a subset of surplus drones for Jungle.com use. Of note, drone provisioning information 430 and drone provisioning information 432 can be the same or different, e.g., drone provisioning information 432 can include information that first tier drones have already been searched, different preferences/parameters can be included in 432, etc.

Figure 5:
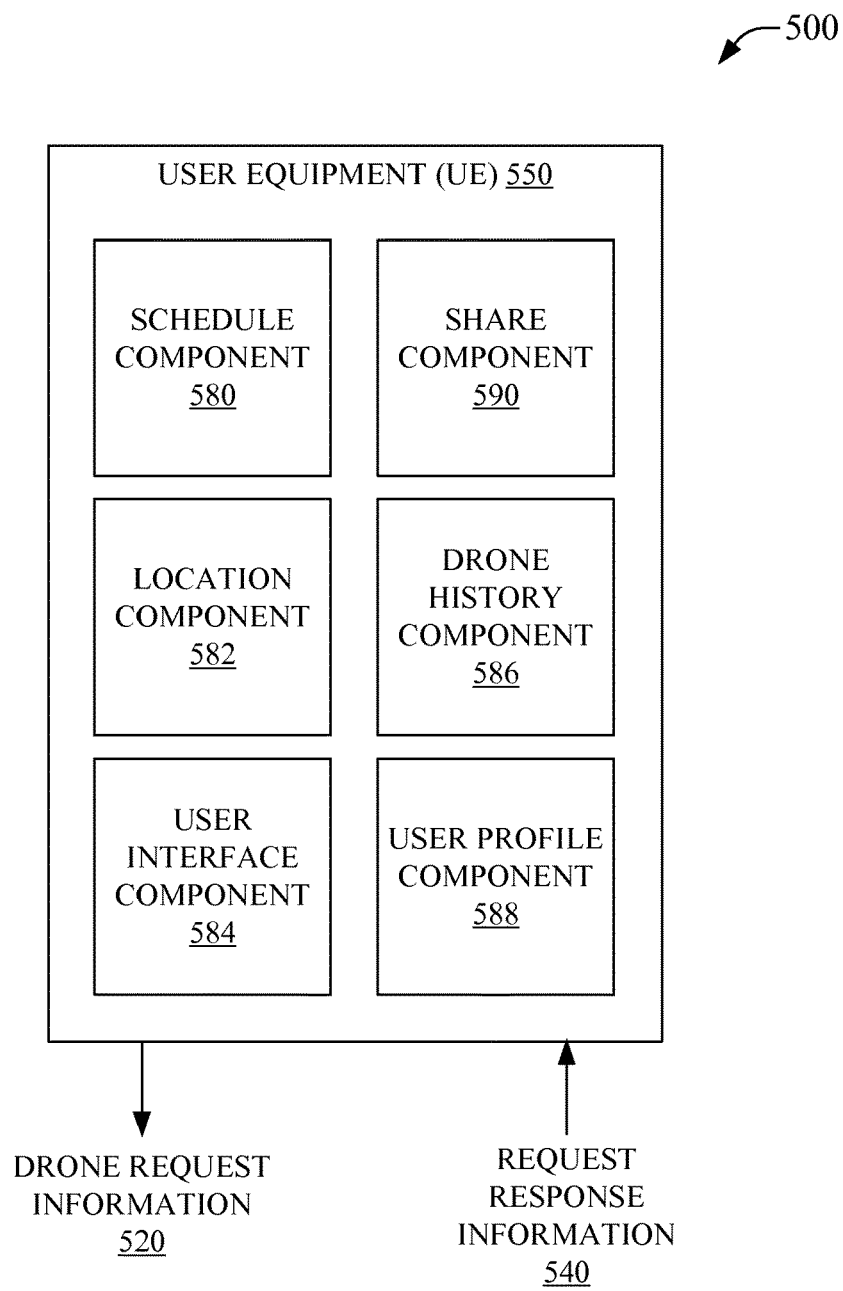
FIG. 5 illustrates an example system facilitating remote provisioning of drone resources based on user-centric information components in accordance with aspects of the subject disclosure.

FIG. 5 illustrates a system 500 that facilitates remote provisioning of drone resources based on user-centric information components in accordance with aspects of the subject disclosure. System 500 can include UE 550 that can generate drone request information 520. UE 550 that can receive request response information 540.

UE 550 can comprise schedule component 580 that can enable access to schedule information. Schedule information can be related to a user's schedule. The user's schedule can be populated by the user, other users, assistants, or other devices. As an example, a user can schedule an event, a spouse can place an event in the user's schedule, a conference call event can be placed in the user's schedule by an office device or a web based service, etc. This schedule information can be employed in remotely provisioning a drone resource. As an example, a user can reserve a drone for video capture of an upcoming round of golf with friends. The reservation, e.g., provisioning of the drone, can be associated with the golf event in the user's calendar. Where an intervening phone conference pushes the time of the golf event to start an hour later, the schedule information can be employed to update or cancel the drone reservation, generate a user input as to rescheduling the drone usage, etc. Further, inferences can be made based on the schedule information, such as inferring that changing the tee time by 10 minutes will not result in cancellation of the drone rental but that a change of three hours would result in cancellation of the drone rental. Further, in an aspect, schedule component 580 can access schedule information for other determined profiles. As an example, where the user has scheduled the golf event, but one of the other golfers schedules changes, this information can be employed to update the drone provisioning, for example, where the other golfer was designated as an operator, another operator can be substituted and their control device information can be employed to ensure that an acceptable drone is provisioned. As such, if the substitute operator will use an tablet to interact with the drone while executing the mission, the change in schedule can precipitate an update to the provisioning to ensure that the provisioned drone can interact with that tablet.

In an embodiment, UE 550 can comprise location component 582 that can enable access to location information. Location information can be employed in remotely provisioning a drone resource. Location information can be for UE 550 itself, or for other devices, e.g., GPS information, untimed fingerprint location information, proximity information, etc. Further, location component 582 can facilitate access to location information related to a mission, such as, but not limited to, determining location information for drone mission paths, waypoints, depths, altitudes, obstacles, etc. As an example, a map can be employed to designate a drone flight path, wherein location component 582 can access information related to the path such as longitude, latitude, proximity to beacons, etc. Further, the two dimensional map information can be used to access elevation information, e.g., additional dimensional information, so as to populate an altitude parameter for the drone to fly to avoid a controlled flight into an obstacle. Of note, the altitude parameter can be employed in provisioning a drone and/or in conjunction with executing a mission. In the provisioning, the altitude can be employed to select drones capable of flying that altitude and excluding others. For example, where the mission path traverses a high mountain pass, some drones may lack the ability to operate in the thinner air at higher elevations and can be excluded from the set of drones comprising a drone that will be provisioned. While this example is related to altitude, similar examples are inherently supported for information related to depth, slew or yaw rate, passing through orifices, etc., which can be related to location information, for example, determining a distance between two objects that a flight path passes between can be important in drone selection. Location information can be accessed from UE 550 or from other location information sources via UE 550. In some embodiments, location information can be included in drone request information 520 that can be supplemented, for example by additional details received by a DAC via other devices, such as remote map servers.

UE 550 can also comprise user interface (UI) component 584 to enable remote drone allocation. UI component 584 can receive information related to user interactions. These interaction can be touch, motion, audio, visual, etc. As an example, a user can input UI information via a touch screen, such as on a smartphone, via verbal commands, e.g., via a UE microphone, by tilting, rotating, or otherwise interacting with the position of the UE, e.g., tilting left can cause a mission path to move left, etc., a UE camera can capture images that can be employed in determining mission parameters and operation of a drone, etc. In an embodiment, these UI techniques can be combined in any combination, such as a user designating a path by dragging a finger along a map displayed on their UE and verbally designating waypoints, altitudes, angles, levels of zoom, microphone on/off, etc., as part of designating mission parameters. In a way, the user can act almost like movie director in that they can virtually fly the designated path of the example and tilt the UE to affect different desired drone or payload movements, while speaking other commands, such as zoom in, zoom out, hover, etc., and interacting with gesture commands. UI component 584 can receive input from nearly any UI and enable that input to be employed in determining drone request information 520 to facilitate remote provisioning of a drone. Moreover, UI component 584 can further be employed in updating a provisioning, executing a mission, etc.

UE 550 can comprise drone history component 586, which can receive information related to the historical use of drones related to a user profile. This information can encompass prior mission types, prior operational data, user satisfaction surveys, or nearly any other historical information related to the use of a drone by the user. As an example, where a user has previously rented an 'alpha drone', successfully used it, and gave positive feedback as to the alpha drone. A new request for provisioning of an alpha drone can be accompanied by the flight statistics from the prior alpha drone flights. This can enable selection of an alpha drone that meets the parameters of the historical flights and accommodates the user's learning curve for operation for alpha drones. Further, where the expertise of the user in alpha drones satisfies a training rule, such as based on the historical flight time logged and flight statistics, a recommendation can be made to the user to use a beta drone (more advanced) where the upcoming mission parameters are within the beta drone envelope and the performance is improved over the alpha drone. Of course, where the user regularly crashes alpha drones, the ability to provision a beta drone can be withheld or downgraded, insurance can be required, etc.

System 500 can further comprise UE 550, which can include user profile component 588. User profile component 588 can enable access to user profile information related to a determined user. In an aspect, user profile information can include user determined preferences, user certification and/or training information, user device(s) information, etc. Also, as disclosed elsewhere herein, user profile component 588 can enable access to historical user information stored in relation to the user profile. This can include records of prior drone usage and operation, historical payment information, billing information, memberships and/or benefits, recurring events, e.g., birthdays, anniversaries, kids' sporting events, etc. These can be relevant to suggesting or promoting reservation of a drone for the event, and/or constraints on drone parameters for a current drone request, etc. This information can be included in drone request information 520, which can be employed by a DAC to provision a drone resource.

UE 550 can comprise share component 590 that can facilitate sharing information related to provisioning a drone, executing a mission, etc. In an aspect, share component 590 can provide for including other people in a drone request, such that they can be designated as invited, attending, declined, tentative, etc., and/or can be designated as an operator, spectator, etc. As such, information related to a person, e.g., someone invited and indicated as an operator of the drone, can be sourced to DAC as part of the provisioning of the drone. As an example, where the invited operator will use an augmented reality wearable device to control the drone for part of the mission, the provisioning of the drone can include the constraint that the drone should interface with the augmented reality wearable device. Furthermore, the example invited operator location and schedule information can be included to compensate for delays form a change in schedule or traffic on the way to a mission control point. Additionally, the example invited operator drone history can be indicated via drone request information 520, to help ensure that an appropriate drone is selected for provisioning. Nearly any information pertinent to the provisioning of a drone, execution of a mission, etc., can be received or accessed via share component 590 to facilitate improved provisioning of a drone for a mission and/or operation of a drone on mission. In an embodiment, accessing or receiving this shared information can be subject to privacy controls/rules, such as getting permission to share said information.

Of note, any of the components illustrated as comprised in UE 550 can be located in other devices or in a distributed manner. They are illustrated as part of UE 550 merely for simplicity and brevity. As an example, Drone history component 586 can be located on a cloud server and can provide supportive information to the provisioning of a drone, such as by passing information to a DAC as part of generating drone provisioning information, e.g., 130-430, 432, etc., or to UE 550 in generating drone request information 120-220, 420-520, etc.

Figure 6:
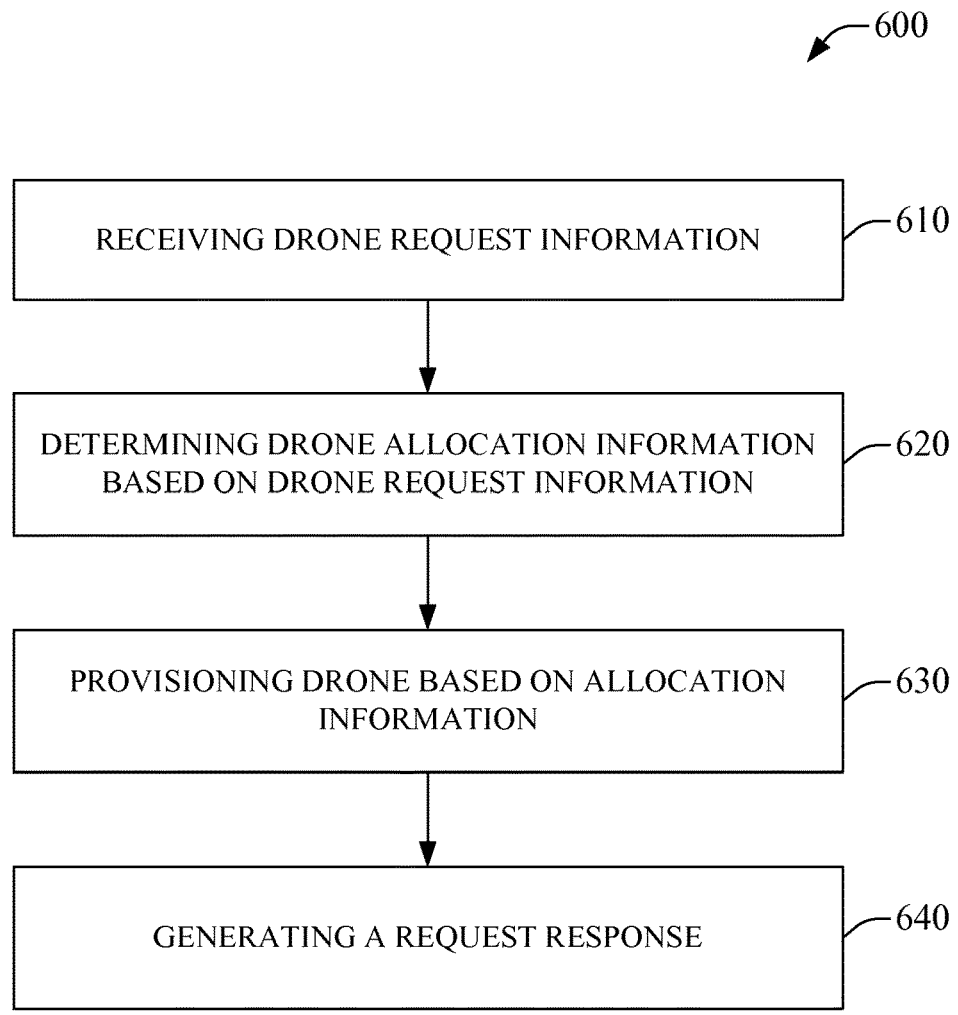
FIG. 6 illustrates an example method facilitating remote provisioning of drone resources in accordance with aspects of the subject disclosure.
Figure 7:
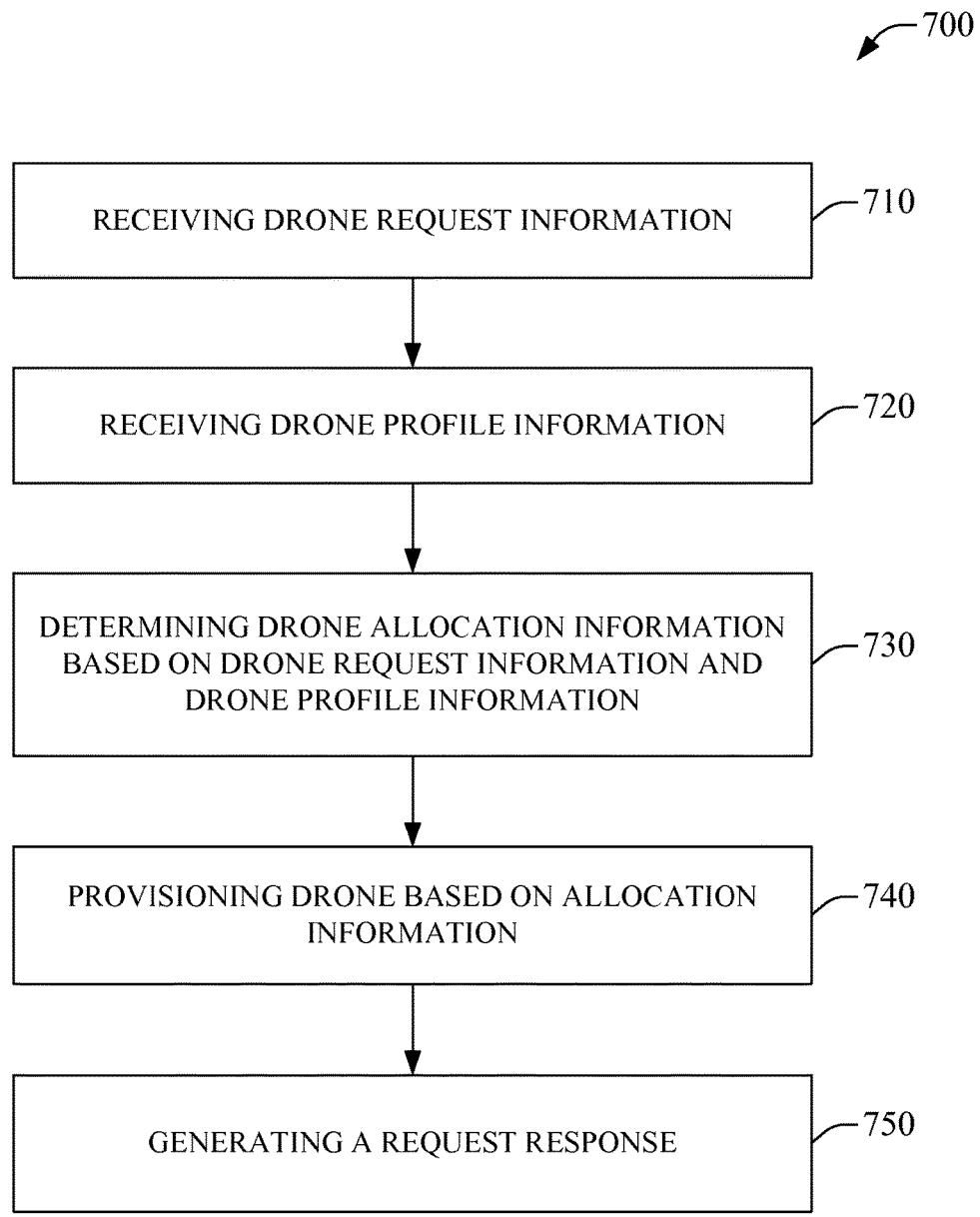
FIG. 7 depicts an example method facilitating remote provisioning of drone resources based on drone information in accordance with aspects of the subject disclosure.
Figure 8:
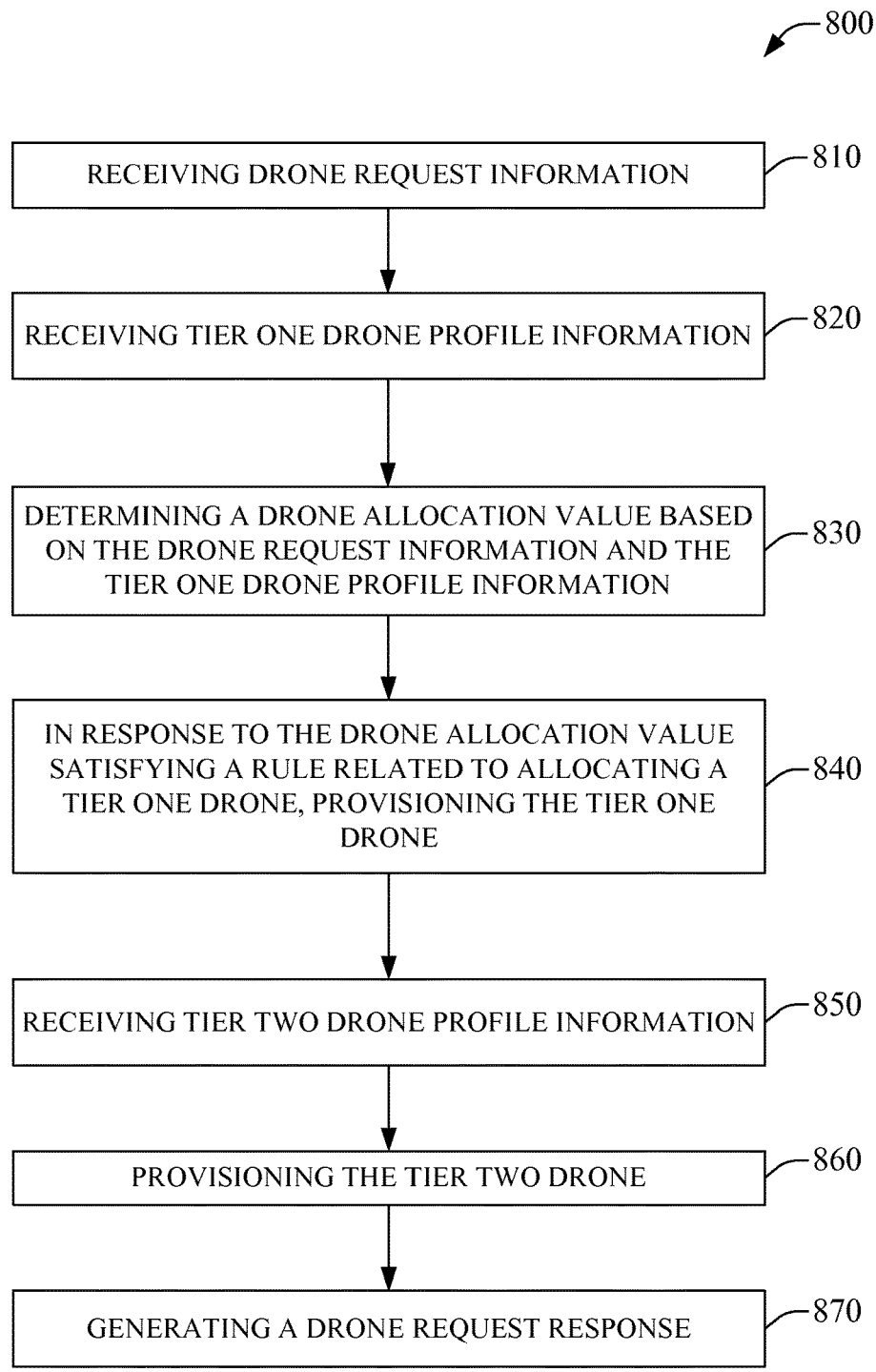
FIG. 8 illustrates an example method facilitating remote provisioning of drone resources organized in a tiered environment in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 illustrates a method 600 facilitating remote provisioning of drone resources in accordance with aspects of the subject disclosure. At 610, method 600 can comprise receiving drone request information. In an embodiment, the drone request information can be received from a UE, such as, but not limited to a mobile device. Drone request information can comprise information related to requesting provisioning of a drone or drone related resource. Drone request information can comprise name, address, phone number, identification information, account information, profile information, certifications information, logged hours or other training, mission parameters, such as, but not limited to, mission location, mission time, mission duration, mission type, mission payload, mission controller or interaction devices/services, level of autonomy, other drones/devices associated with the mission, etc., clearances, permits, approvals, waivers, mission path, mission locus resources available, e.g., power, fuel, internet connectivity, etc., historical drone use, additional operators/controllers, etc. It will be noted that nearly any pertinent information can be included in drone request information.

In an embodiment, drone request information can be generated by a mobile device, a desktop computer, a laptop computer, a wearable computing device, etc. Moreover, drone request information can be originated by a first device, e.g., a mobile device, and can be supplemented with associated information from other devices. Further, drone request information can comprise information that can be used to infer parameters, allowing a device, such as DAC 110-410, etc., to determine a drone that meets explicit and inferred parameters. It will be noted that nearly any information vector can be employed in inferring values that can be employed in determining satisfaction of a drone allocation parameter.

At 620, method 600 can comprise determining drone allocation information based on the drone request information of 610. Determining drone allocation information can include determining selection parameters from the drone request information of 610 and/or other supplemental information sources. Selection parameters can include, but are not limited to, a type of drone, a drone specification, a mission operating environment, drone availability, price, proximity, rules or laws, user profile, scheduling, a control interface or feature thereof, prior use of drones by the user, insurance features, intended use characteristics, certification, training, geographical or political boundaries, etc. Wherein, selection parameters can further be based on other information, for example, drone set information, drone information for drones comprising a drone set, weather information, schedule information related to persons related to the mission event, etc., such supplemental information can be received as part of method 600, though not illustrated for clarity and brevity. The selection information can be employed to determine what, if any, drone in one or more sets of available drones satisfy drone allocation parameters based on drone request information and other related information. Additionally, selection parameters can identify a drone, a set of drones, multiple sets of drones, tiers of drones, etc. This information can be employed in determining, in conjunction with the selection information, a drone to provision.

At 630, method 600 can comprise provisioning a drone based on drone allocation information from 620. Drone provisioning information can be determined from drone allocation information and made accessible to one or more drones. As such, an allocated drone, e.g., a selected drone, can receive drone provisioning information. The drone can then indicate, either affirmatively, by absence of a refusal, etc., that it accepts being provisioned.

At 640, method 600 can comprise, in response to the drone indicating that it accepts being provisioned, request response information can be generated, such as by DAC 110-410, etc. At this point method 600 can end. Request response information can indicate that provisioning was successful, that selection of a drone was made but provisioning failed, that a drone could not be selected that met the parameters, alternate drones available and information on what parameters are not satisfied, etc. Request response information can function to provide information back to the requestor about the state of fulfilling a drone request, including information related to the provisioning of a drone. In some embodiments, request response information can further comprise a request for additional parameter information where a large set of drones meet the parameters. In further embodiments, request response information can comprise information related to user selection of an available drone, for example, where two drones are available and meet the parameters, the selection choice can be left to the user.

In an aspect, rather than provisioning a single drone, multiple drones can be provisioned and request response information can reflect information related to the provisioning of multiple drones. Moreover, where only one drone is needed from the set of provisioned drones, provisioned drones can be released from the provisioning according to one or more rules. In some embodiments, drone provisioning can occur in one drone set, in multiple drone sets, in one tier, or in multiple tiers.

FIG. 7 illustrates a method 700 that facilitates remote provisioning of drone resources based on drone information in accordance with aspects of the subject disclosure. At 710, method 700 can comprise receiving drone request information. Drone request information can comprise information related to requesting provisioning of a drone or drone related resource. Drone request information can comprise name, address, phone number, identification information, account information, profile information, certifications information, logged hours or other training, mission parameters, such as, but not limited to, mission location, mission time, mission duration, mission type, mission payload, mission controller or interaction devices/services, level of autonomy, other drones/devices associated with the mission, etc., clearances, permits, approvals, waivers, mission path, mission locus resources available, e.g., power, fuel, internet connectivity, etc., historical drone use, additional operators/controllers, etc. It will be noted that nearly any pertinent information can be included in drone request information.

In an embodiment, drone request information can be generated by a mobile device, a desktop computer, a laptop computer, a wearable computing device, etc. Moreover, drone request information can be originated by a first device, e.g., a mobile device, and can be supplemented with associated information from other devices. Further, drone request information can comprise information that can be used to infer parameters, allowing a device, such as DAC 110-410, etc., to determine a drone that meets explicit and inferred parameters. It will be noted that nearly any information vector can be employed in inferring values that can be employed in determining satisfaction of a drone allocation parameter.

At 720, method 700 can comprise receiving drone profile information.

Drone profile information can relate to features, characteristics, or availability of one or more drones, one or more sets of one or more drones, or one or more tiers of drones. Drone profile information can be compared to or filtered against explicit or implicit drone request information to enable selection of a drone that is appropriate for a mission based on the drone request information. In some embodiments, drones can populate drone profiles to facilitate rapid dissemination of drone profile information to devices that are employed in remote provisioning of drone resources, e.g., DAC 110-410, etc. As such, this aspect can allow new drones to be added to sets of available drones that can be accessed by devices seeking to allocate drone resources, for example, drone profile information can enable a 'plug-n-play' type architecture for nearly anyone to add a drone to an internet-wide list of available drone resources. As such, drone profile information can comprise information related to the capabilities of the drone, modifications to the drone, payloads available, locations, ranges, availability, tier information, rules, pricing rates, restrictions, whitelists or blacklists of users, etc.

At 730, method 700 can comprise determining drone allocation information based on the drone request information and the drone profile information. Determining drone allocation information can include determining selection parameters. Drone allocation information can further be based on other supplemental information sources relevant to the process. Selection parameters can include, but are not limited to, a type of drone, a drone specification, a mission operating environment, drone availability, price, proximity, rules or laws, user profile, scheduling, a control interface or feature thereof, prior use of drones by the user, insurance features, intended use characteristics, certification, training, geographical or political boundaries, etc. Selection parameters can further comprise information, such as, drone set information, drone information for drones comprising a drone set, weather information, schedule information related to persons related to the mission event, etc. The selection information can be employed to determine what, if any, drone in one or more sets of available drones satisfy drone allocation parameters. Additionally, selection parameters can identify a drone, a set of drones, multiple sets of drones, tiers of drones, etc. This information can be employed in determining, in conjunction with the selection information, a drone to provision.

At 740, method 700 can comprise provisioning a drone based on drone allocation information from 720. Drone provisioning information can be determined from drone allocation information and made accessible to one or more drones. As such, an allocated drone, e.g., a selected drone, can receive drone provisioning information. The drone can then indicate, either affirmatively, by absence of a refusal, etc., that it accepts being provisioned.

At 750, method 700 can comprise, in response to the drone indicating that it accepts being provisioned, request response information can be generated, such as by DAC 110-410, etc. At this point method 700 can end. Request response information can indicate that provisioning was successful, that selection of a drone was made but provisioning failed, that a drone could not be selected that met the parameters, alternate drones available and information on what parameters are not satisfied, etc. Request response information can function to provide information back to the requestor about the state of fulfilling a drone request, including information related to the provisioning of a drone. In some embodiments, request response information can further comprise a request for additional parameter information where a large set of drones meet the parameters. In further embodiments, request response information can comprise information related to user selection of an available drone, for example, where two drones are available and meet the parameters, the selection choice can be left to the user.

In an aspect, rather than provisioning a single drone, multiple drones can be provisioned and request response information can reflect information related to the provisioning of multiple drones. Moreover, where only one drone is needed from the set of provisioned drones, provisioned drones can be released from the provisioning according to one or more rules. In some embodiments, drone provisioning can occur in one drone set, in multiple drone sets, in one tier, or in multiple tiers.

FIG. 8 illustrates a method 800 that facilitates remote provisioning of drone resources organized in a tiered environment in accordance with aspects of the subject disclosure. At 810, method 800 can comprise receiving drone request information. Drone request information can comprise information related to requesting provisioning of a drone or drone related resource. Drone request information can comprise name, address, phone number, identification information, account information, profile information, certifications information, logged hours or other training, mission parameters, such as, but not limited to, mission location, mission time, mission duration, mission type, mission payload, mission controller or interaction devices/services, level of autonomy, other drones/devices associated with the mission, etc., clearances, permits, approvals, waivers, mission path, mission locus resources available, e.g., power, fuel, internet connectivity, etc., historical drone use, additional operators/controllers, etc. It will be noted that nearly any pertinent information can be included in drone request information.

In an embodiment, drone request information can be generated by a mobile device, a desktop computer, a laptop computer, a wearable computing device, etc. Moreover, drone request information can be originated by a first device, e.g., a mobile device, and can be supplemented with associated information from other devices. Further, drone request information can comprise information that can be used to infer parameters, allowing a device, such as DAC 110-410, etc., to determine a drone that meets explicit and inferred parameters. It will be noted that nearly any information vector can be employed in inferring values that can be employed in determining satisfaction of a drone allocation parameter.

At 820, method 800 can comprise receiving tier one drone profile information. Drone profile information can relate to features, characteristics, or availability of one or more drones, one or more sets of one or more drones, or one or more tiers of drones. Drone profile information can be compared to or filtered against explicit or implicit drone request information to enable selection of a drone that is appropriate for a mission based on the drone request information. In some embodiments, drones can populate drone profiles to facilitate rapid dissemination of drone profile information to devices that are employed in remote provisioning of drone resources, e.g., DAC 110-410, etc. As such, this aspect can allow new drones to be added to sets of available drones that can be accessed by devices seeking to allocate drone resources, for example, drone profile information can enable a 'plug-n-play' type architecture for nearly anyone to add a drone to an internet-wide list of available drone resources. As such, drone profile information can comprise information related to the capabilities of the drone, modifications to the drone, payloads available, locations, ranges, availability, tier information, rules, pricing rates, restrictions, whitelists or blacklists of users, etc. In an embodiment, drone profiles can be received for one or more drones comprising a tier one drone set.

At 830, method 800 can comprise determining drone allocation value based on the drone request information and the tier one drone profile information. Determining drone allocation value can include determining selection parameters. A drone allocation value can further be based on other supplemental information sources relevant to the process. Selection parameters can include, but are not limited to, a type of drone, a drone specification, a mission operating environment, drone availability, price, proximity, rules or laws, user profile, scheduling, a control interface or feature thereof, prior use of drones by the user, insurance features, intended use characteristics, certification, training, geographical or political boundaries, etc. Selection parameters can further comprise information, such as, drone set information, drone information for drones comprising a drone set, weather information, schedule information related to persons related to the mission event, etc. The selection information can be employed to determine what, if any, drone in one or more sets of available drones satisfy drone allocation parameters. Additionally, selection parameters can identify a drone, a set of drones, multiple sets of drones, tiers of drones, etc. This information can be employed in determining, in conjunction with the selection information, a drone to provision.

At 840, method 800 can comprise provisioning a tier one drone in response to the drone allocation value satisfying a rule related to allocating a tier one drone. Drone provisioning information can be determined from drone allocation information and made accessible to one or more drones of tier one. As such, an allocated drone, e.g., a selected drone, can receive drone provisioning information. The drone can then indicate, either affirmatively, by absence of a refusal, etc., that it accepts being provisioned.

At 850, method 800 can comprise receiving tier two drone profile information. Drone profiles can be received for one or more drones comprising a tier two drone set. In an embodiment, where a drone has been provisioned at 840, method 800 can skip to 870. However, where no drone was provisioned at 840, method 800 can evaluate tier two drones for mission fitness. In another embodiment, even where a tier one drone is provisioned at 840, a drone from tier two can be additionally provisioned. In an aspect, this can provide redundancy or supplemental drone reservation based on the request. Moreover, where the tier one drone later initiates mission execution, the provision of the tier two drone can be released.

At 860, method 800 can comprise provisioning a tier two drone in response to the drone allocation value satisfying a rule related to allocating a tier two drone. Drone provisioning information can be determined from drone allocation information and made accessible to one or more drones of tier two. As such, an allocated drone, e.g., a selected drone, can receive drone provisioning information. The drone can then indicate, either affirmatively, by absence of a refusal, etc., that it accepts being provisioned.

At 870, method 800 can comprise, in response to the tier one and/or tier two drone indicating that it/they accept(s) being provisioned, request response information can be generated. At this point method 800 can end. Request response information can indicate that provisioning was successful, that selection of a drone(s) was made but provisioning failed, that a drone(s) could not be selected that met the parameters, alternate drone(s) available and information on what parameters are not satisfied, etc. Request response information can function to provide information back to the requestor about the state of fulfilling a drone(s) request, including information related to the provisioning of a drone(s). In some embodiments, request response information can further comprise a request for additional parameter information where a large set of drone(s) meet the parameters. In further embodiments, request response information can comprise information related to user selection of an available drone(s), for example, where two drones are available and meet the parameters, the selection of one or more drone(s) can be left to the user.

In an aspect, rather than provisioning a single tier one or tier two drone, multiple drones can be provisioned in either tier or between the tiers, and request response information can reflect information related to the provisioning of multiple drones. Moreover, where only one drone is needed from a set of provisioned drones, provisioned drones can be released from the provisioning according to one or more rules. In some embodiments, drone provisioning can occur in one drone set, in multiple drone sets, in one tier, or in multiple tiers.

Figure 9:
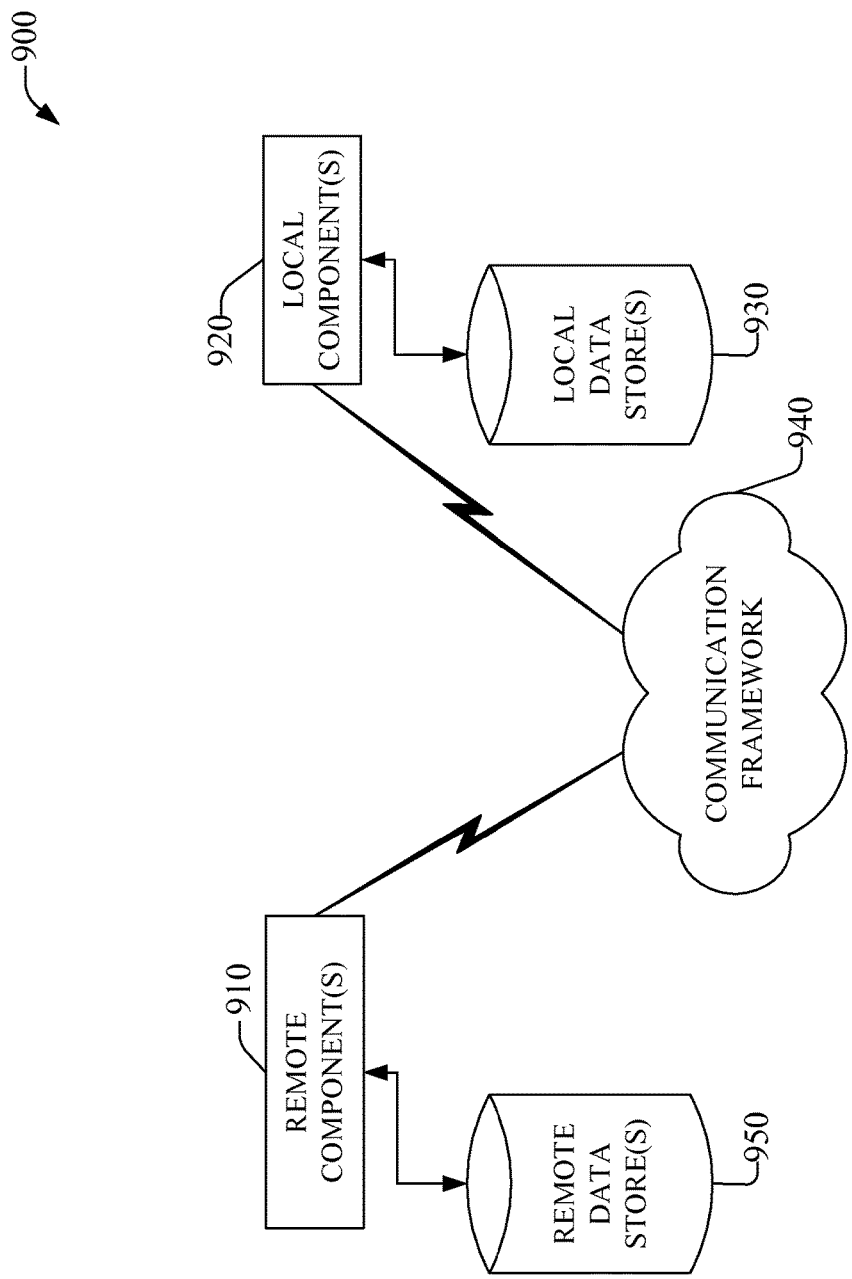
FIG. 9 depicts an example schematic block diagram of a computing environment with which the disclosed subject matter can interact.

FIG. 9 is a schematic block diagram of a computing environment 900 with which the disclosed subject matter can interact. The system 900 includes one or more remote component(s) 910. The remote component(s) 910 can be hardware and/or software (e.g., threads, processes, computing devices). In some embodiments, remote component(s) 910 can include servers, personal servers, wireless telecommunication network devices, etc. As an example, remote component(s) 910 can be DAC 110, 210, 410, etc., Drone 270, 372, 374, 376, etc., Tier 1 drone 430, tier 2 drone 472, etc.

The system 900 also includes one or more local component(s) 920. The local component(s) 920 can be hardware and/or software (e.g., threads, processes, computing devices). In some embodiments, local component(s) 920 can include, for example, UE 250, 350, 450, etc., DAC 110, 310, 410, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 includes a communication framework 940 that can be employed to facilitate communications between the remote component(s) 910 and the local component(s) 920, and can include an air interface, e.g., Uu interface of a UMTS network. Remote component(s) 910 can be operably connected to one or more remote data store(s) 950, such as a hard drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Figure 10:
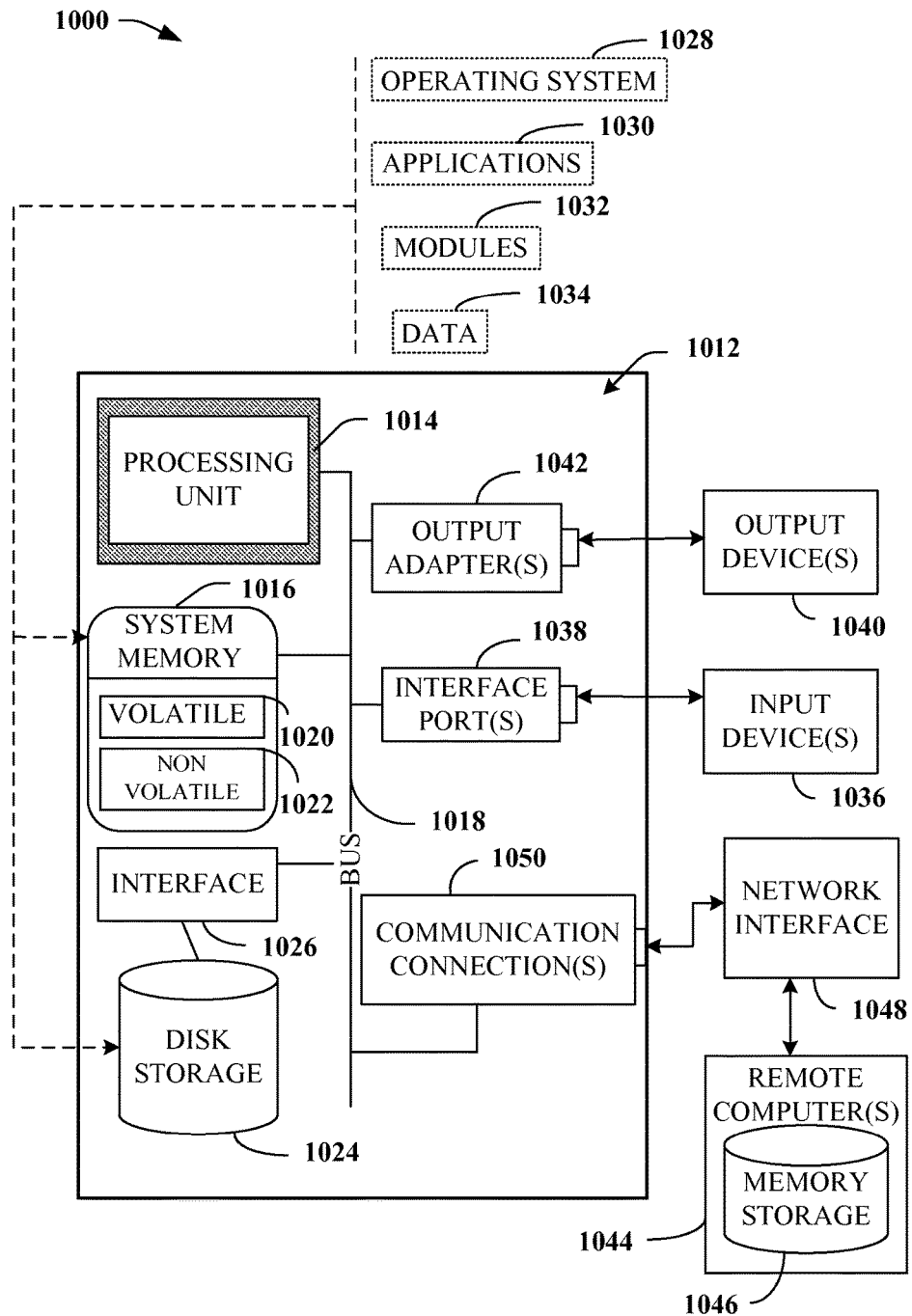
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, including single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, part of DAC 11-, 21-, 310, 410, etc., drone 270, 372, 374, 376, etc., tier 1 drone 470, tier 2 drone 472, etc., UE 250, 350, 550, etc., includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can include volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can include read only memory, programmable read only memory, electrically programmable read only memory, electrically erasable read only memory, or flash memory. Volatile memory 1020 includes read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synchlink dynamic read only memory, Rambus direct read only memory, direct Rambus dynamic read only memory, and Rambus dynamic read only memory.

Computer 1012 can also include removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, cause a system comprising a processor to perform operations, comprising: receiving drone request information a request for data via an air interface or other wireless interface from a remote device, e.g., UE 250, 550, etc., and in response to the receiving drone request information, generating drone provisioning information that can be accessed via an air interface or other wireless interface by one or more drones to enable remote provisioning of a drone resource.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. As an example, a user interface can allow entry of user preference information, etc., and can be embodied in a touch sensitive display panel, a mouse input GUI, a command line controlled interface, etc., allowing a user to interact with computer 1012. As an example, UI Component 584 can receive touch, motion, audio, visual, or other types of input. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044. As an example, vehicle subsystems, such as headlights, brake lights, stereos, vehicle information sharing device, etc., can include an output adapter 1042 to enable use in accordance with the presently disclosed subject matter.

Computer 1012 can operate in a networked environment using logical connections to one or more remote computers, such as remote computer(s) 1044. Remote computer(s) 1044 can be a personal computer, a server, a router, a network PC, cloud storage, cloud service, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies include fiber distributed data interface, copper distributed data interface, Ethernet, Token Ring and the like. Wide area network technologies include, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and digital subscriber line modems, integrated services digital network adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include broadcast technologies (e.g., sub-Hertz, extremely low frequency, very low frequency, low frequency, medium frequency, high frequency, very high frequency, ultra-high frequency, super-high frequency, terahertz broadcasts, etc.); Ethernet; X.25; power-line-type networking, e.g., Powerline audio video Ethernet, etc.; femtocell technology; Wi-Fi; worldwide interoperability for microwave access; enhanced general packet radio service; third generation partnership project, long term evolution; third generation partnership project universal mobile telecommunications system; third generation partnership project 2, ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
receiving, via a user equipment, a request for coordinated allocation of a first drone resource of a first drone from a first tier of drones and a second drone resource of a second drone from a second tier of drones, wherein the first tier of drones is different from the second tier of drones, wherein the first tier of drones is accessible by a first group of users and not a second group of users, wherein the second tier of drones is accessible by the second group of users, and wherein the first group of users has a more restricted membership than the second group of users;
determining a metric value associated with the request based on a rule related to scoring requests comprising the request for coordinated allocation with respect to drones comprising the first drone and the second drone, wherein the metric value is based on a first attribute of the first drone and a second attribute of the second drone;
provisioning the first and second drones, in response to the request for coordinated allocation, based on the metric value; and
enabling access by the user equipment to the first drone resource associated with the first drone and the second drone resource associated with the second drone in accord with the request.

2. The system of claim 1, wherein the request is a first request, wherein the user equipment is a first user equipment, and wherein the rule enables prioritizing, via the metric value, provisioning of the drones relative to a second request for allocation of the first drone resource from a second user equipment.

3. The system of claim 2, wherein the metric value enabling the prioritizing is determined from an ordering rule different from the scoring rule and related to an order in which the first request and the second request were received, a first subscription tier associated with the first user equipment, a second subscription tier associated with the second user equipment, a first location associated with the first request in comparison to a second location associated with the second request, and a count of requests for allocation of the first drone resource.

4. The system of claim 1, wherein the receiving the request is via a wireless interface or a wired interface.

5. The system of claim 1, wherein the first group of users has a more restricted membership than the second group of users based on members of the first group having access to the first tier of drones corresponding to a subscription to a service receiving the request is via a wired interface.

6. The system of claim 5, further comprising generating response information related to a state of provisioning the drones.

7. The system of claim 6, wherein the response information comprises a request for additional information related to allocating the first drone resource.

8. The system of claim 7, wherein the additional information comprises selection information related to selection of the drones from at least three drones.

9. The system of claim 8, wherein the first tier of drones is a first hierarchical tier of drones, wherein the second tier of drones is a second hierarchical tier of drones, and wherein the first hierarchical tier of drones comprises the first drone, the second hierarchical tier of drones comprises the second drone, and a third hierarchical tier of drones comprises a third drone.

10. The system of claim 9, wherein the provisioning the drones comprises provisioning the first drone of the first hierarchical tier of drones.

11. The system of claim 9, wherein the provisioning the drones comprises provisioning the second drone of the second hierarchical tier of drones.

12. The system of claim 11, wherein the provisioning the drones comprises provisioning the second drone of the second hierarchical tier of drones in response to not provisioning the first drone from the first hierarchical tier of drones.

13. A method, comprising:
receiving, by a system comprising a processor, a request, via a network device, for coordinated allocation of drone resources correlated to drones communicatively coupled to a communications network, wherein the drones are grouped in a first tier of drones and a second tier of drones that is different from the first tier of drones, and wherein a difference between the first tier of drones and the second tier of drones comprises the first tier of drones being accessible by a member user while excluding access by a non-member user and the second tier of drones being accessible by the non-member user;
determining, by the system, a ranking of a drone group of drones associated with the drone resources, wherein the ranking is based on a parameter determined from the request and a first characteristic of a first drone of the first tier of drones and a second characteristic of a second drone of the second tier of drones; and
provisioning, by the system, the drone group based on the request for coordinated allocation of the drone resources and the ranking of the drone group against other drone groups not comprising the drones of the drone group.

14. The method of claim 13, wherein the determining the ranking further comprises determining the ranking based on the parameter determined from the request and a further characteristic of the drone resources associated with the drone group.

15. The method of claim 13, further comprising facilitating, by the system, access to the drone resources in accord with the request as part of executing a mission of the drone group.

16. The method of claim 13, wherein: the parameter determined from the request is a first parameter; and the ranking enables ordering of the drone group relative to the other drone groups based on a second parameter determined from the request and another characteristic of the other drone groups.

17. The method of claim 13, wherein the request is a first request, and wherein the ranking enables ordering of the request for coordinated allocation of the drone resources relative to a second request for the drone resources to enable the provisioning to further provision the drone group associated with the drone resources based on the ordering.

18. A machine-readable storage medium comprising executable instructions that, when executed by a processor, facilitate performance of operations, comprising:
receiving a request for allocation of coordinated drone resources via a network device, wherein drones associated with the drone resources are comprised in a first tier of drones and a second tier of drones that is different from the first tier of drones, wherein the first tier of drones is accessible by first users but is not accessible by second users, and wherein the second tier of drones is accessible by the second users;
determining a ranking score of a group of drones associated with the coordinated drone resources, wherein the ranking score is based on a parameter determined from the request and a characteristic of the group of drones;
selecting the group of drones based on the ranking score; and
provisioning the group of drones based on the request for allocation of the coordinated drone resources.

19. The machine-readable storage medium of claim 18, wherein the selecting the group of drones comprises selecting a first drone from the first tier of drones and a second drone from the second tier of drones available drones comprising a first hierarchical tier of drones and a second hierarchical tier of drones.

20. The machine-readable storage medium of claim 18, wherein the determining the ranking score based on the parameter comprises determining a scheduling parameter based on schedule information of a profile associated with a user identity.

* * * * *